(12) United States Patent
Hong et al.

(10) Patent No.: US 10,048,843 B2
(45) Date of Patent: Aug. 14, 2018

(54) MOBILE TERMINAL AND CONTROLLING METHOD THEREOF

(71) Applicant: LG ELECTRONICS INC., Seoul (KR)

(72) Inventors: Jipyo Hong, Seoul (KR); Taehoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/012,558

(22) Filed: Feb. 1, 2016

(65) Prior Publication Data

US 2017/0068424 A1  Mar. 9, 2017

(30) Foreign Application Priority Data

Sep. 7, 2015 (KR) .......................... 10-2015-0126341

(51) Int. Cl.
| | |
|---|---|
| *G06F 3/0484* | (2013.01) |
| *B64C 39/02* | (2006.01) |
| *G05D 1/00* | (2006.01) |
| *H04N 5/232* | (2006.01) |
| *G06F 3/0482* | (2013.01) |
| *H04M 1/725* | (2006.01) |

(52) U.S. Cl.
CPC ........ *G06F 3/04842* (2013.01); *B64C 39/024* (2013.01); *G05D 1/0016* (2013.01); *G05D 1/0044* (2013.01); *G06F 3/0482* (2013.01); *H04M 1/72533* (2013.01); *H04N 5/23203* (2013.01); *H04N 5/23293* (2013.01); *B64C 2201/127* (2013.01); *B64C 2201/146* (2013.01)

(58) Field of Classification Search
CPC .......................... G06F 3/04842; B64C 39/024
See application file for complete search history.

(56) References Cited

U.S. PATENT DOCUMENTS

| | | | |
|---|---|---|---|
| 8,903,568 B1 * | 12/2014 | Wang ................... | G05D 1/0016 701/2 |
| 2008/0137756 A1 * | 6/2008 | Scherlis ............... | H04N 21/235 375/240.28 |
| 2011/0273570 A1 | 11/2011 | Sakaki | |

(Continued)

FOREIGN PATENT DOCUMENTS

| | | |
|---|---|---|
| EP | 2 450 862 A1 | 5/2012 |
| JP | 2011-239149 A | 11/2011 |

(Continued)

*Primary Examiner* — Jess Whittington
(74) *Attorney, Agent, or Firm* — Birch, Stewart, Kolasch & Birch, LLP

(57) ABSTRACT

A mobile terminal including a display; a wireless communication processor configured to transceive data with a drone and an external device through wireless communication; and a controller configured to display a mobile terminal graphic object corresponding to the mobile terminal, an external device graphic object corresponding to the external device, a drone control menu object and a camera control menu object on the display, assign the external device to control the drone in response to the external device graphic object and the drone control menu object being selected, and assign the external device to control the camera on the drone in response to the external device graphic object and the camera control menu object being selected.

9 Claims, 21 Drawing Sheets

(56) References Cited

U.S. PATENT DOCUMENTS

| | | | |
|---|---|---|---|
| 2014/0035736 A1* | 2/2014 | Weddle | G05D 1/005 340/407.2 |
| 2014/0240313 A1* | 8/2014 | Varga | G06T 19/006 345/419 |
| 2014/0354791 A1* | 12/2014 | Lee | G06K 9/00228 348/77 |
| 2015/0043886 A1 | 2/2015 | Bang et al. | |
| 2015/0116748 A1* | 4/2015 | Suese | G03G 15/502 358/1.13 |
| 2015/0243163 A1* | 8/2015 | Shoemake | G08C 23/02 367/197 |
| 2015/0244807 A1* | 8/2015 | Shoemake | H04L 67/125 709/202 |
| 2016/0098085 A1 | 4/2016 | Weddle et al. | |
| 2016/0327950 A1* | 11/2016 | Bachrach | G05D 1/0016 |
| 2016/0364004 A1* | 12/2016 | Ekandem et al. | B64C 13/04 |

FOREIGN PATENT DOCUMENTS

| | | | | |
|---|---|---|---|---|
| KR | 10-2014-0068430 A | | 6/2014 | |
| KR | 20140068430 | * | 6/2014 | ............. B25J 13/06 |
| KR | 10-2014-0112352 A | | 9/2014 | |
| KR | 10-2015-0018125 A | | 2/2015 | |

* cited by examiner

FIG. 7
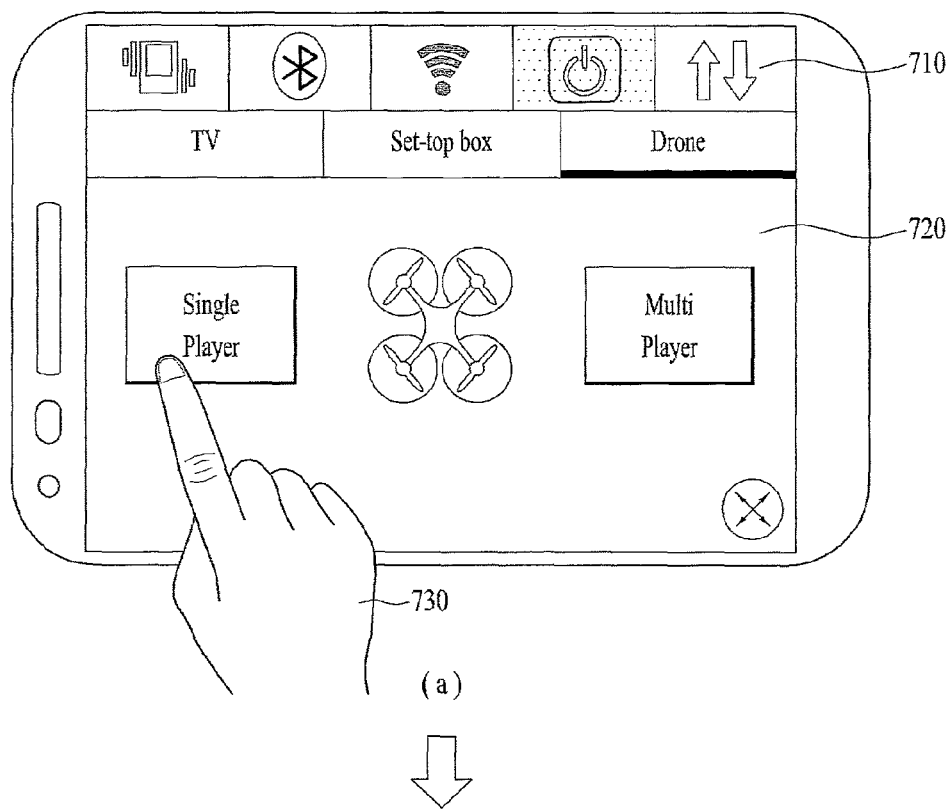
(a)
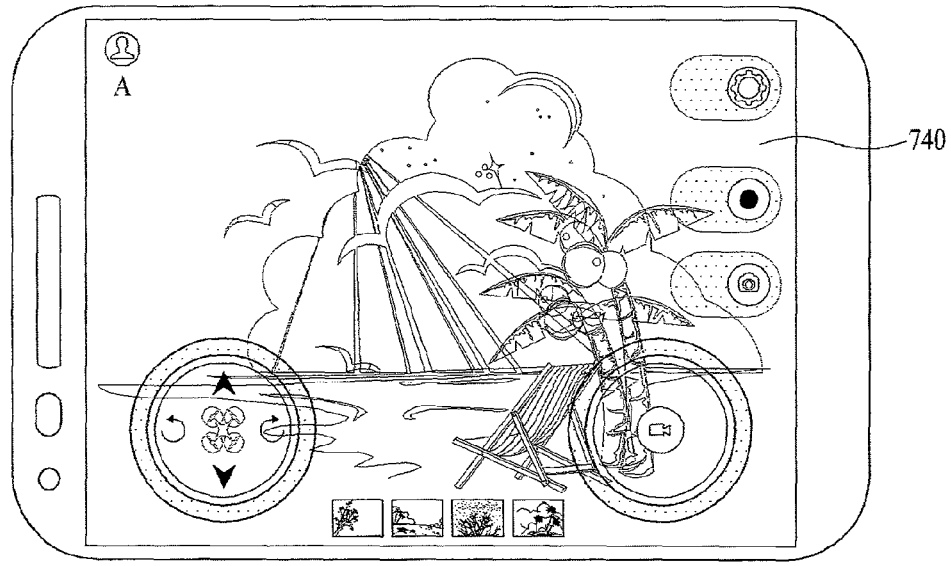
(b)

FIG. 8
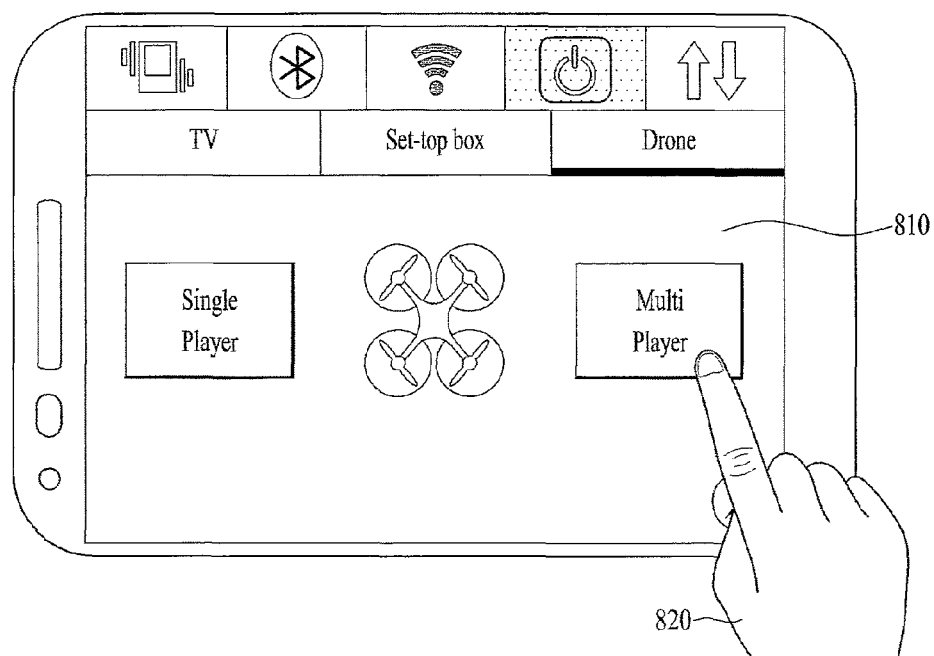
(a)
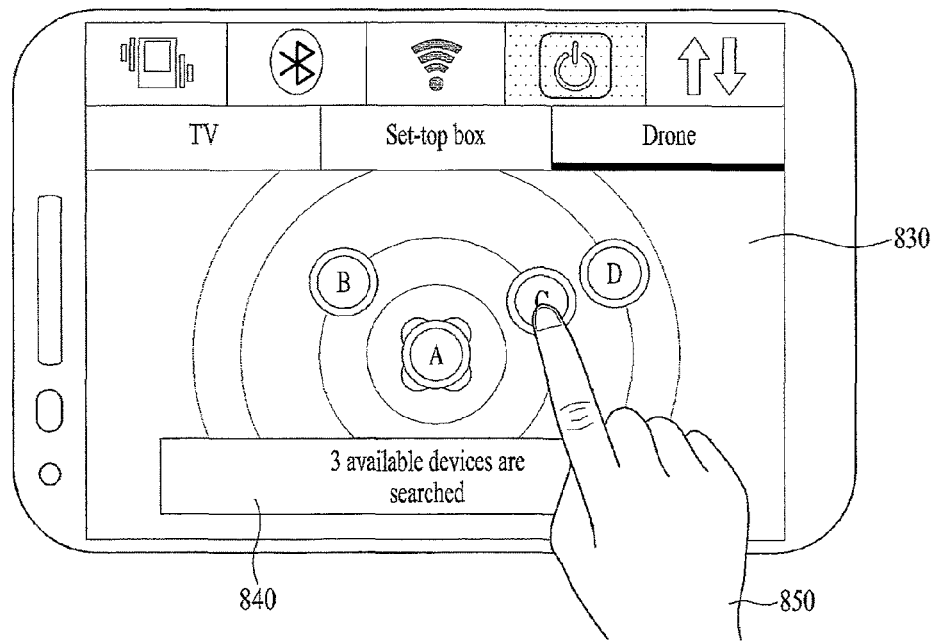
(b)

FIG. 9
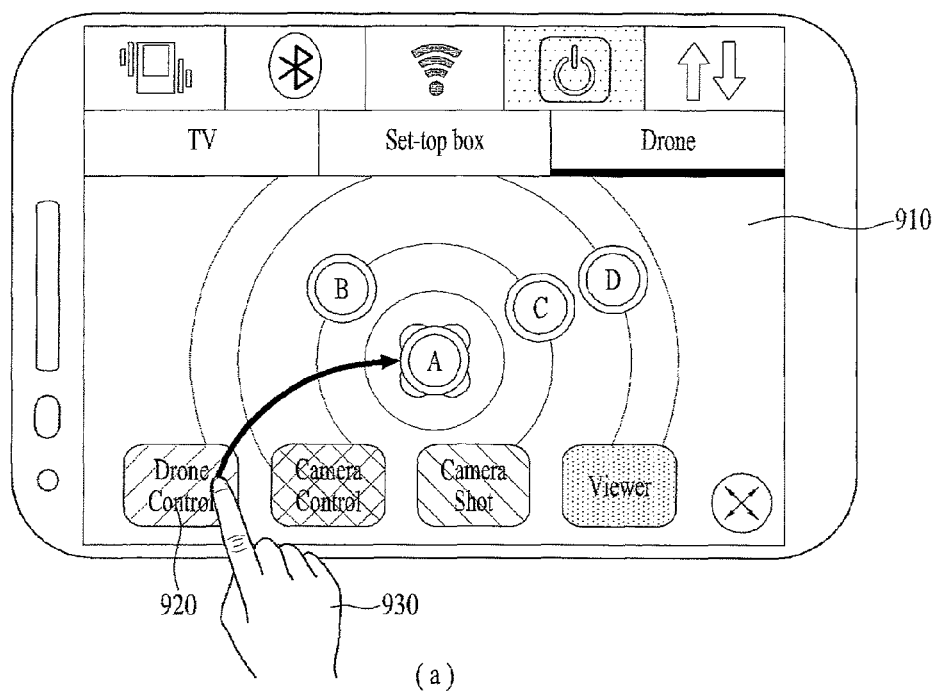
(a)
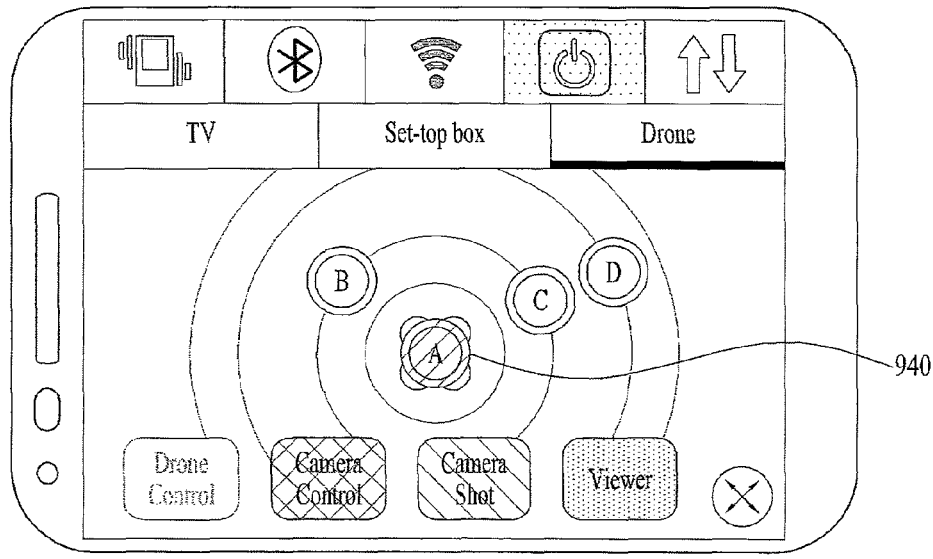
(b)

FIG. 12
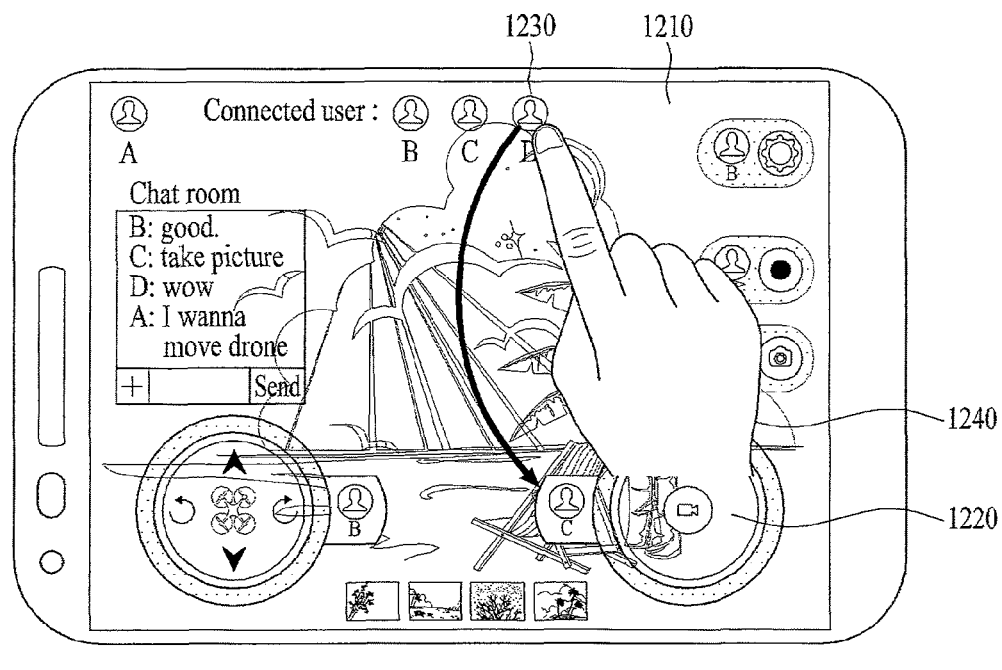
(a)
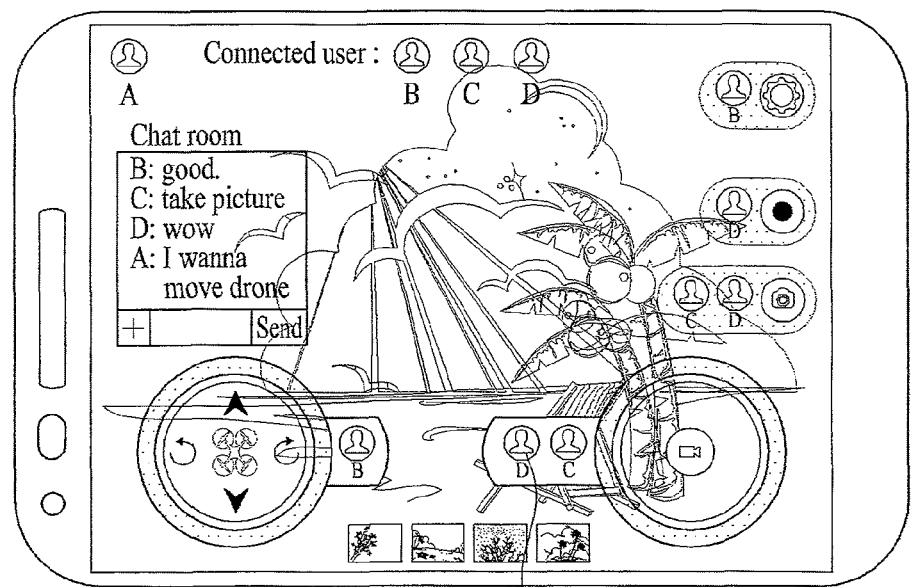
(b)

FIG. 13
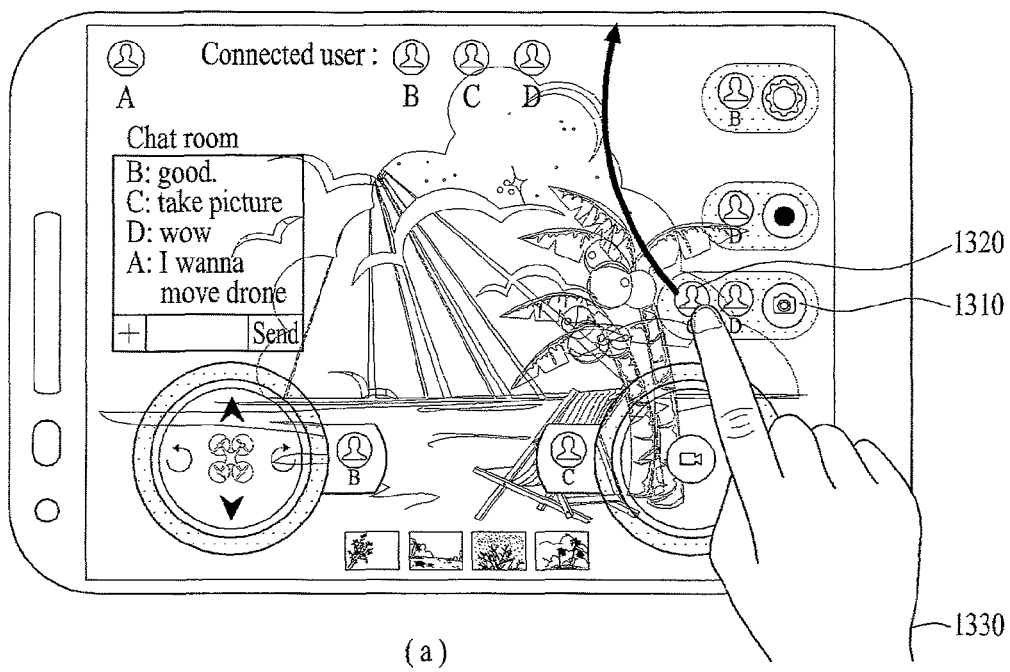
(a)
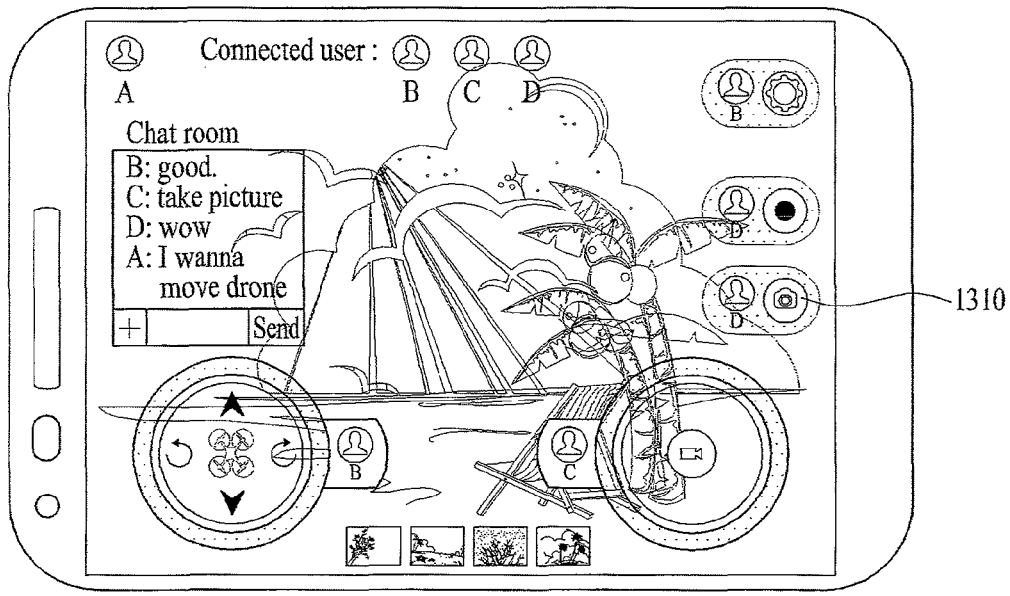
(b)

FIG. 14
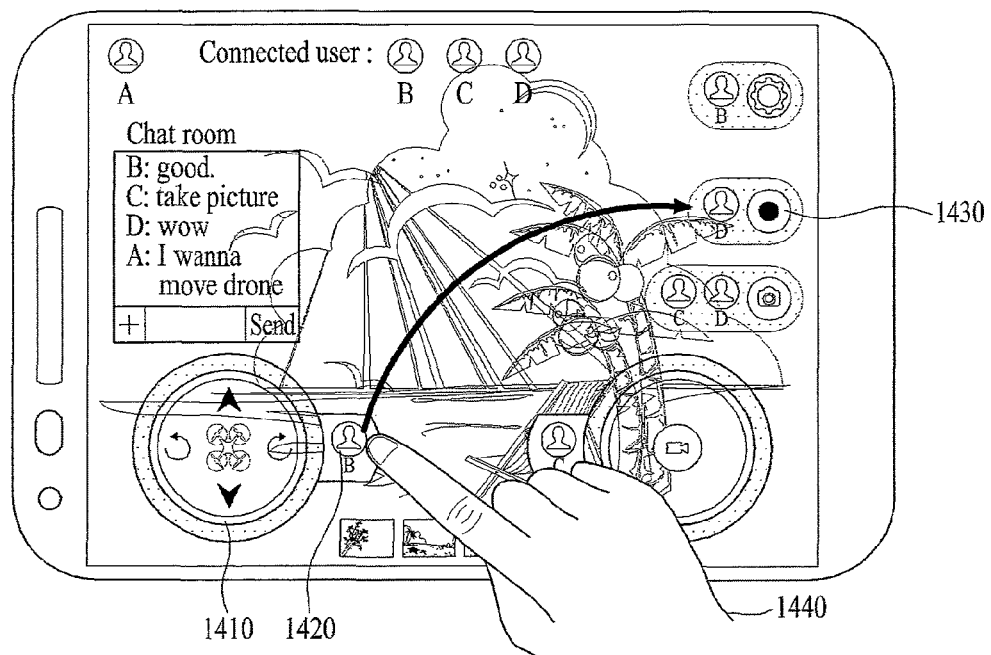
(a)
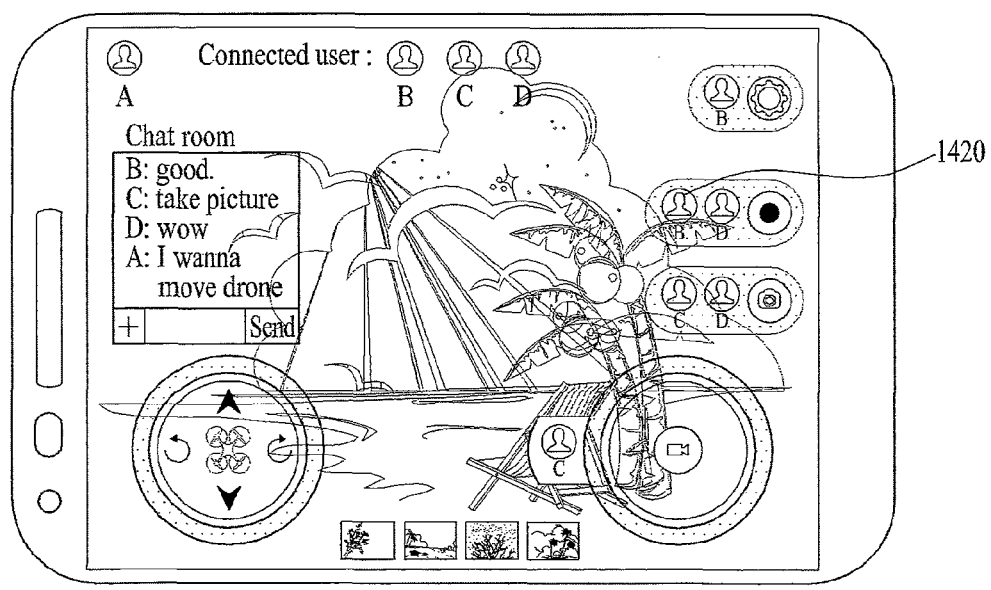
(b)

FIG. 16
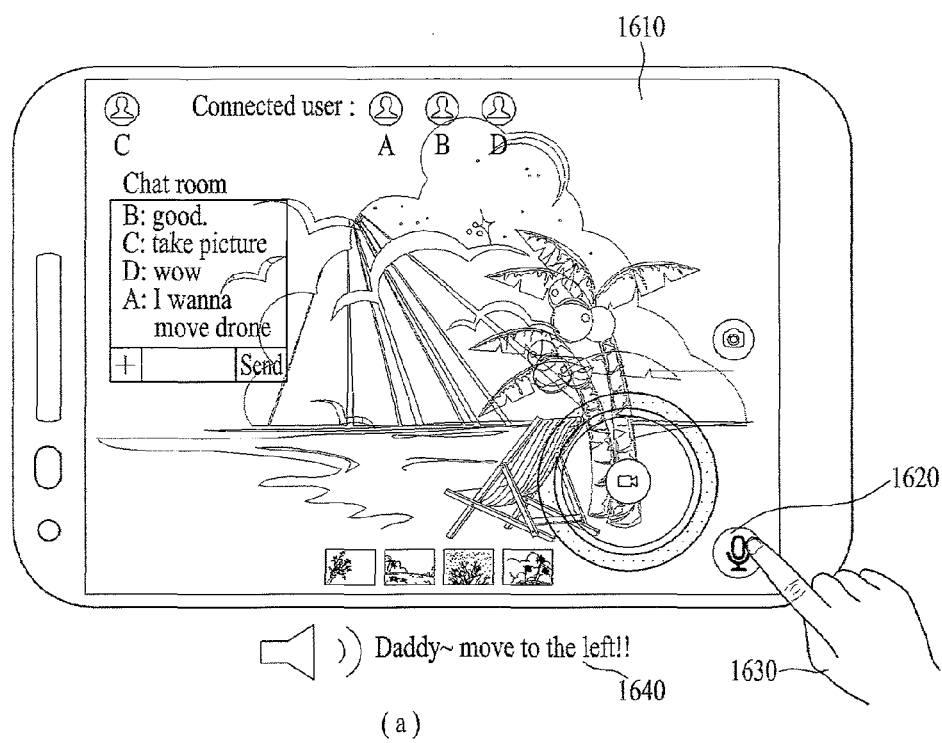
(a)
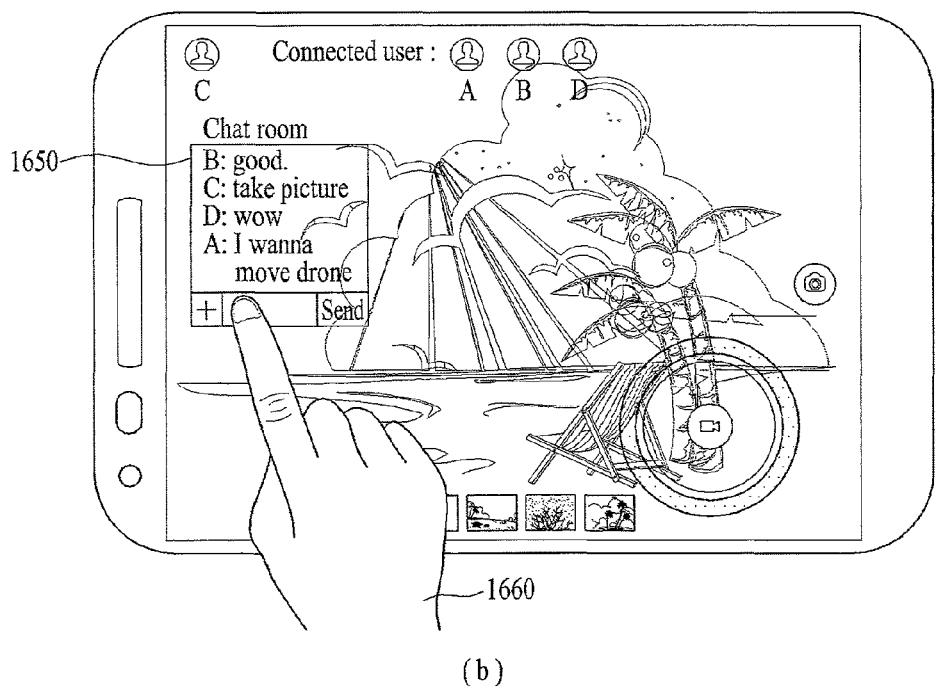
(b)

FIG. 17
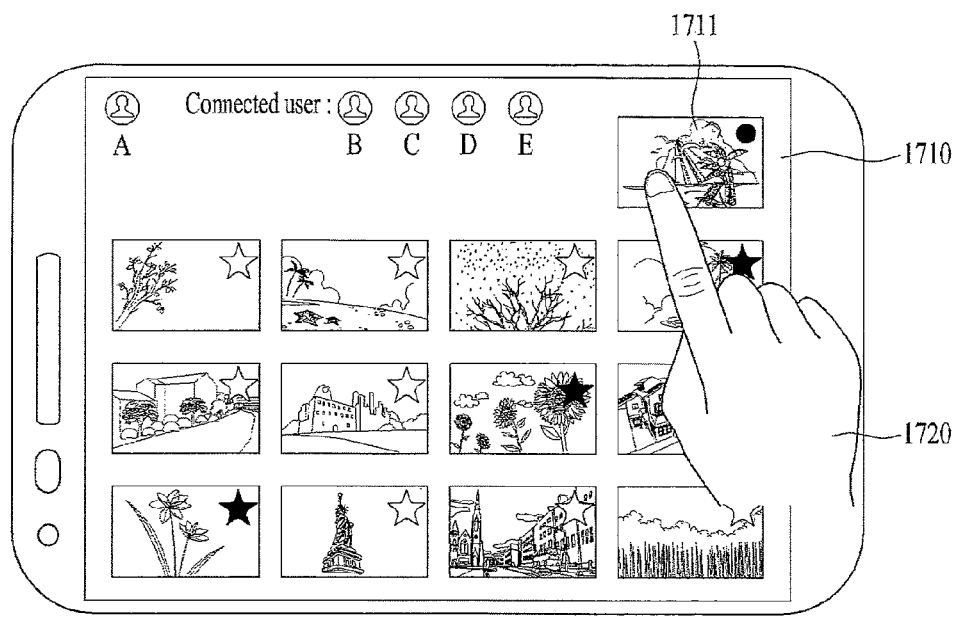
(a)
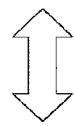
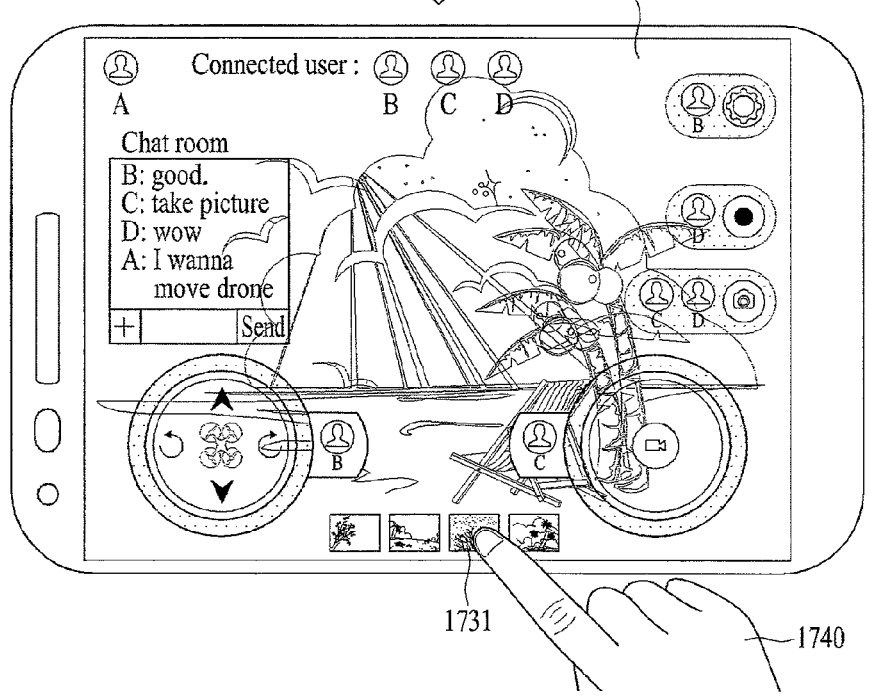
(b)

FIG. 18
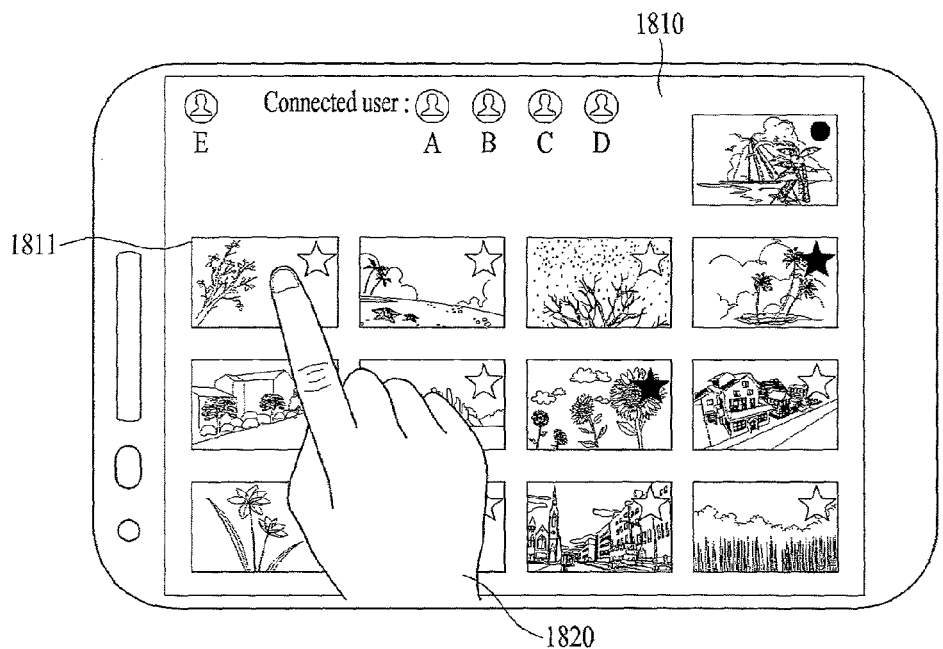
(a)
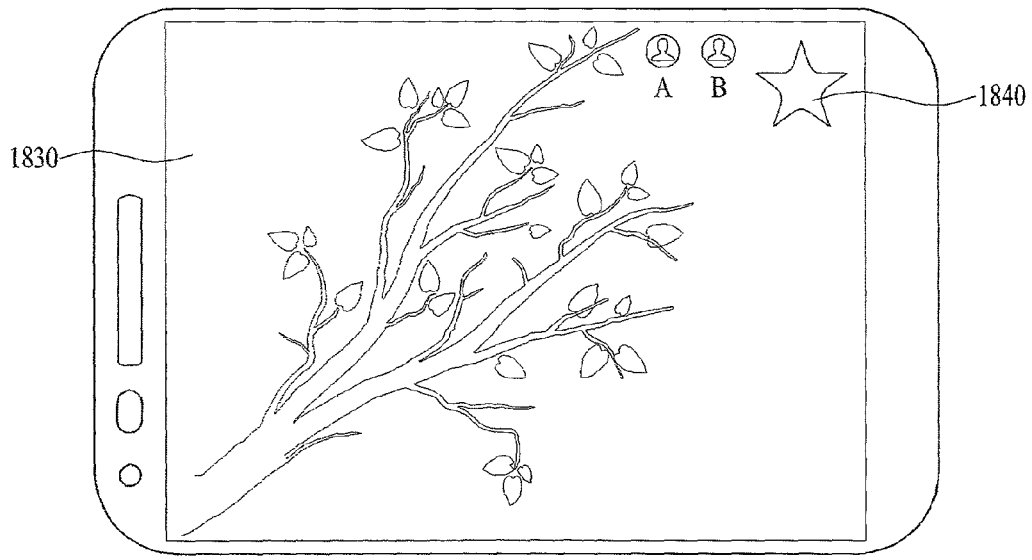
(b)

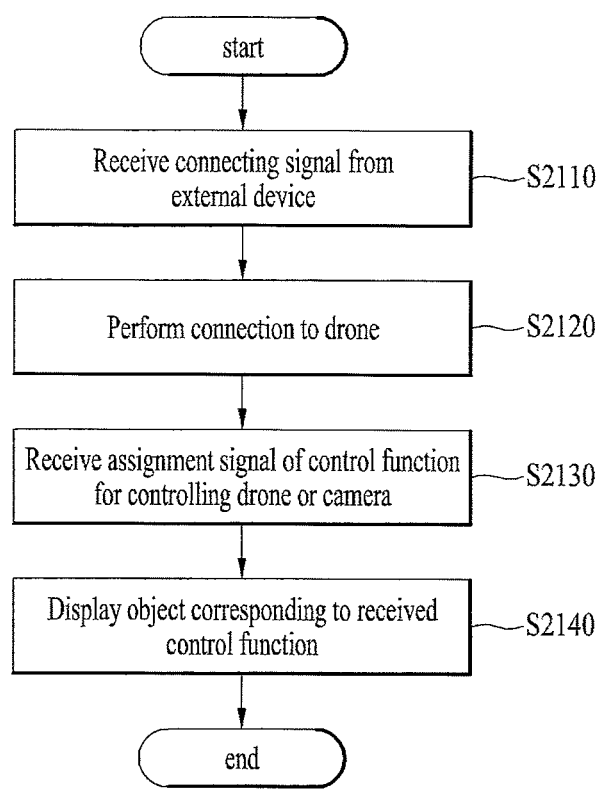

MOBILE TERMINAL AND CONTROLLING METHOD THEREOF

Pursuant to 35 U.S.C. § 119(a), this application claims the benefit of earlier filing date and right of priority to Korean Application No. 10-2015-0126341, filed on Sep. 7, 2015, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for setting functions related to a drone control in an external device in order to control a drone connected to a mobile terminal and a camera included on the drone through a plurality of devices.

Discussion of the Related Art

A mobile terminal can perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. Further, the mobile terminals can be classified into handheld terminals and vehicle mounted terminals. There are ongoing efforts to support and increase the functionality of mobile terminals. Such efforts include software and hardware improvements, as well as changes and improvements in the structural components which form the mobile terminal.

Recently, drones operable by individuals or companies are increasingly on the rise. In more detail, a drone is an unmanned flying object in a shape of a plane or helicopter controlled to fly by control signals of radio waves, for example. While a drone is flying, a user can take a video or images through a camera provided on the drone. However, controlling the drone and camera is inconvenient for the user.

SUMMARY OF THE INVENTION

Accordingly, the present invention is directed to a mobile terminal and controlling method thereof that substantially obviate one or more of the problems due to limitations and disadvantages of the related art.

One object of the present invention is to provide a mobile terminal and controlling method thereof, by which a drone can be controlled in accordance with a function assigned to each of a plurality of devices connected to the drone in case of making a video or taking an image for the drone.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile terminal according to one embodiment the present invention includes a display, a wireless communication processor configured to transceive data with a drone and an external device through wireless communication, and a controller configured to: display a mobile terminal graphic object corresponding to the mobile terminal, an external device graphic object corresponding to the external device, a drone control menu object and a camera control menu object on the display, assign the external device to control the drone in response to the external device graphic object and the drone control menu object being selected, and assign the external device to control the camera on the drone in response to the external device graphic object and the camera control menu object being selected.

To further achieve these and other advantages and in accordance with the purpose of the present invention, as embodied and broadly described, a mobile terminal according to one embodiment the present invention includes a display, a wireless communication unit configured to transceive data with a drone and at least one external device through wireless communication, and a controller configured to: connect to the drone in response to a connecting signal received from the external device, and display a drone control interface for controlling the drone and a camera included on the drone in response to an assignment signal from the external device assigning a control function of the drone to the mobile terminal received.

It is to be understood that both the foregoing general description and the following detailed description of the preferred embodiments of the present invention are exemplary and explanatory and are intended to provide further explanation of the invention as claimed.

Effects obtainable from the present invention may be non-limited by the above mentioned effect. In addition, other unmentioned effects can be clearly understood from the following description by those having ordinary skill in the technical field to which the present invention pertains.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 7 is a diagram illustrating one example of outputting a drone connection interface from a mobile terminal according to an embodiment of the present invention;

FIG. 8 is a diagram illustrating one example of outputting a drone connection interface from a mobile terminal according to an embodiment of the present invention;

FIG. 9 is a diagram illustrating one example of outputting a drone connection interface from a mobile terminal according to an embodiment of the present invention;

FIG. 12 is a diagram illustrating one example of adding a function for a drone control in a mobile terminal according to an embodiment of the present invention;

FIG. 13 is a diagram illustrating one example of removing a function for a drone control in a mobile terminal according to an embodiment of the present invention;

FIG. 14 is a diagram illustrating one example of changing a control function of a drone controllable device in a mobile terminal according to an embodiment of the present invention;

FIG. 16 is a diagram illustrating one example of guiding a control of a drone in a mobile terminal according to an embodiment of the present invention;

FIG. 17 is a diagram illustrating one example of a gallery interface corresponding to a gallery object in a mobile terminal according to an embodiment of the present invention;

FIG. 18 is a diagram illustrating one example of a gallery interface corresponding to a gallery object in a mobile terminal according to an embodiment of the present invention;

FIG. 21 is a flowchart illustrating a method of controlling a mobile terminal according to an embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
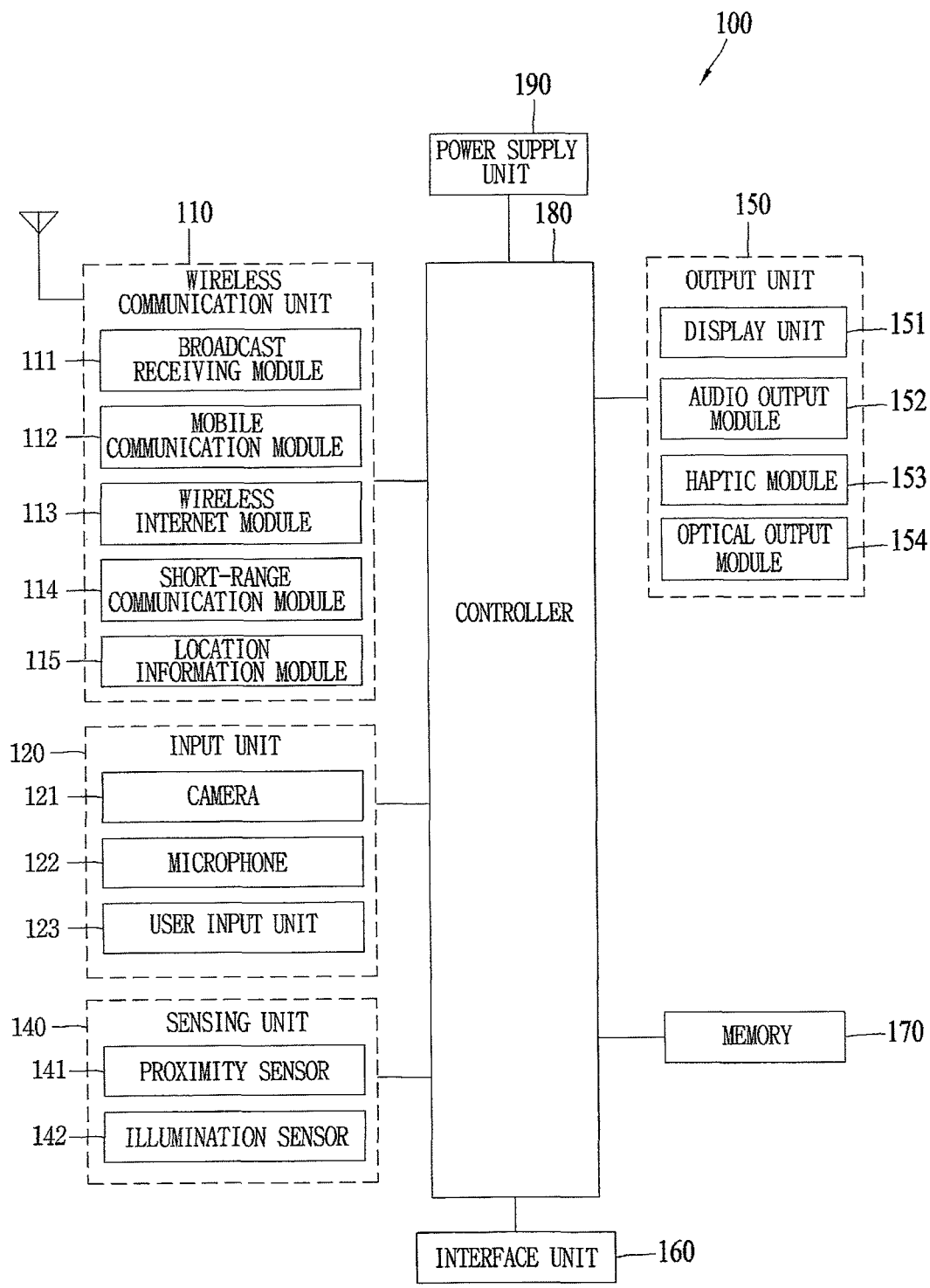
FIG. 1A is a block diagram of a mobile terminal in accordance with the present disclosure.
Figure 1B:
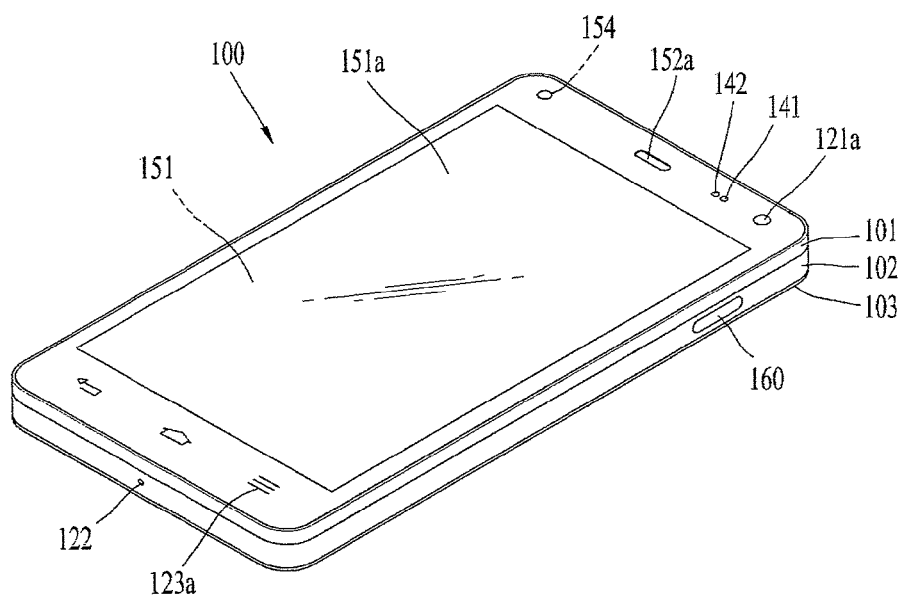
FIGS. 1B and 1C are conceptual views of one example of the mobile terminal, viewed from different directions.
Figure 1C:
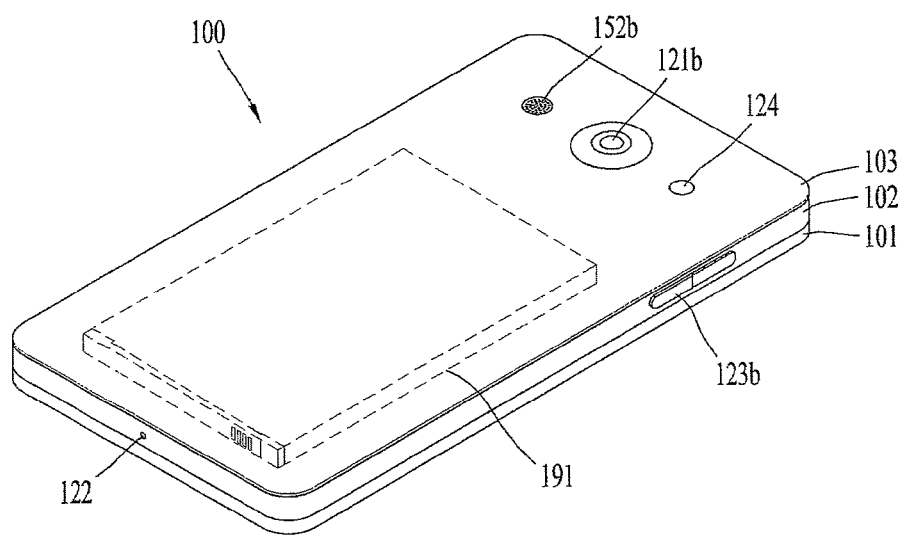

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and information input or output through the components mentioned in the foregoing description or runs an application program saved in the memory 170, thereby providing or processing information or function appropriate for to a user.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further, according to an embodiment of the present invention, information processed by the mobile terminal can be displayed using a flexible display. This is described in detail with reference to the accompanying drawings as follows.

Figure 2:
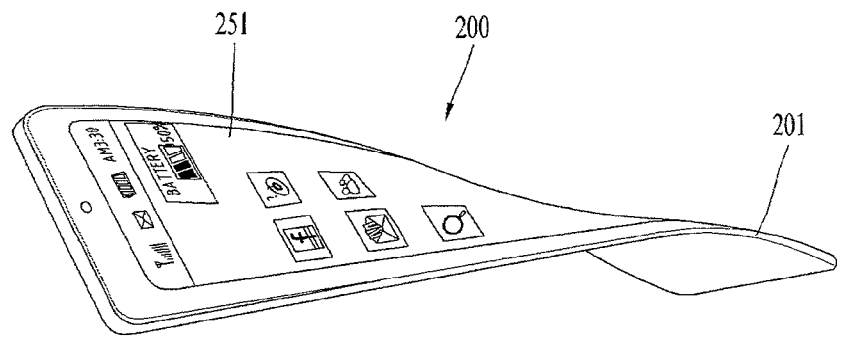
FIG. 2 is a conceptual view of a deformable mobile terminal according to an alternative embodiment of the present disclosure.

FIG. 2 is a conceptual view of a deformable mobile terminal according to an alternative embodiment of the present invention. As shown, the mobile terminal 200 includes a display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140. The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like. In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
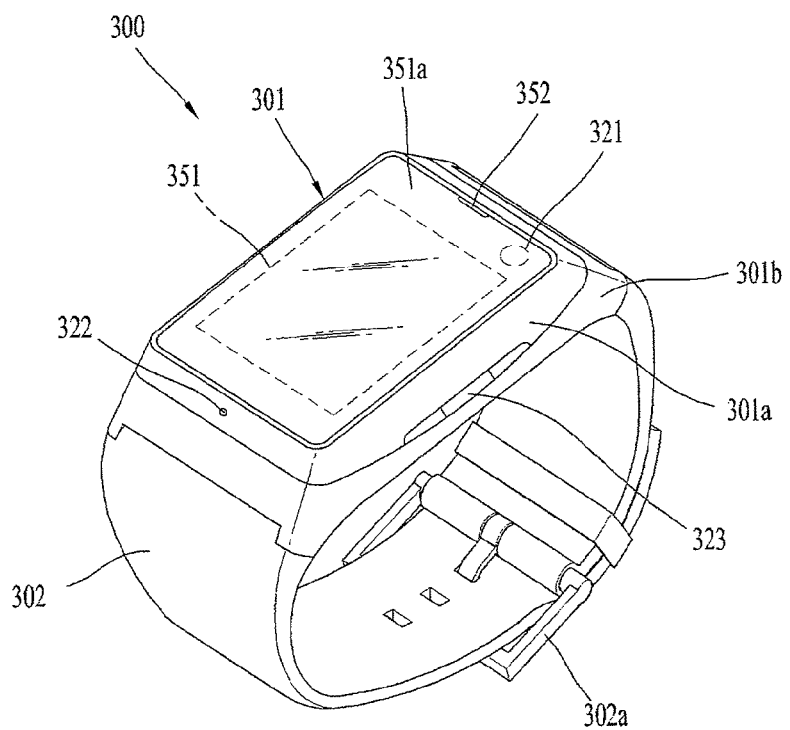
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
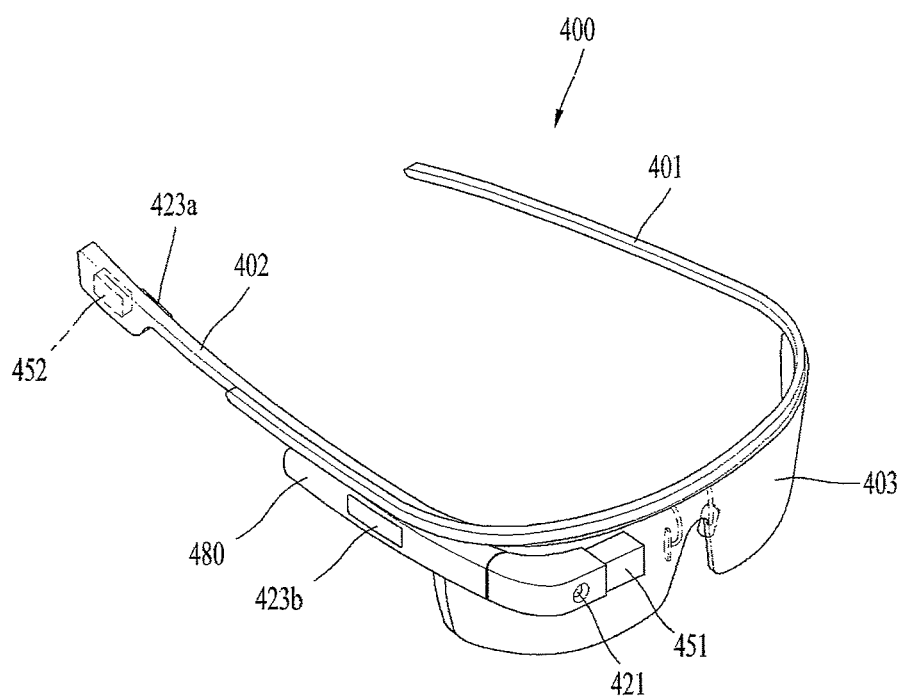
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations.

The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information. The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5:
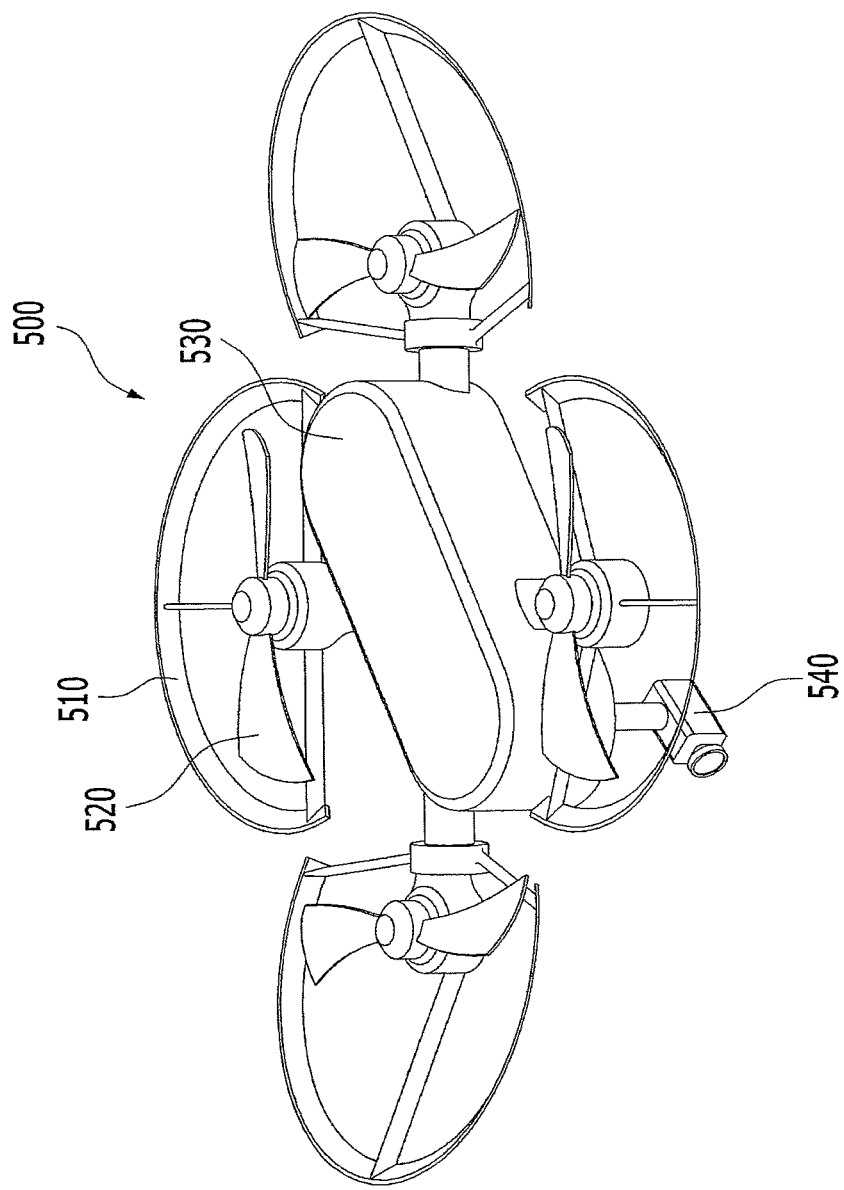
FIG. 5 is a diagram illustrating one example of an external appearance of a drone controlled by a mobile terminal according to an embodiment of the present invention.

Next, FIG. 5 is a diagram illustrating one example of an external appearance of a drone 500 controlled by a mobile terminal 100 according to an embodiment of the present invention. Referring to FIG. 5, the drone 500 includes a propeller guard 510, a propeller 520, a body 530, a camera 540 and the like. However, the present invention is not limited by the configuration of the drone 500 shown in FIG. 5. In particular, the present invention is applicable to drones of various types including a helicopter type (e.g., a tricopter with 3 propellers, a quadcopter with 4 propellers shown in FIG. 5, an octacopter with 8 propellers, etc.), an airplane type and the like.

The propeller guard 510 is configured to prevent a human or animal from being hurt by an operation of the propeller 520 and may be omitted. The propeller 520 and the camera 540 operate in response to a control signal of the body 530. In addition, a wireless communication module configured to communicate with a mobile terminal is included in the body 530. According to an embodiment, a motion of the camera 540 can be precisely controlled using a separate control signal different from the control signal of the body 530. The configuration of the drone 500 is described in detail with reference to FIG. 6 as follows.

Figure 6:
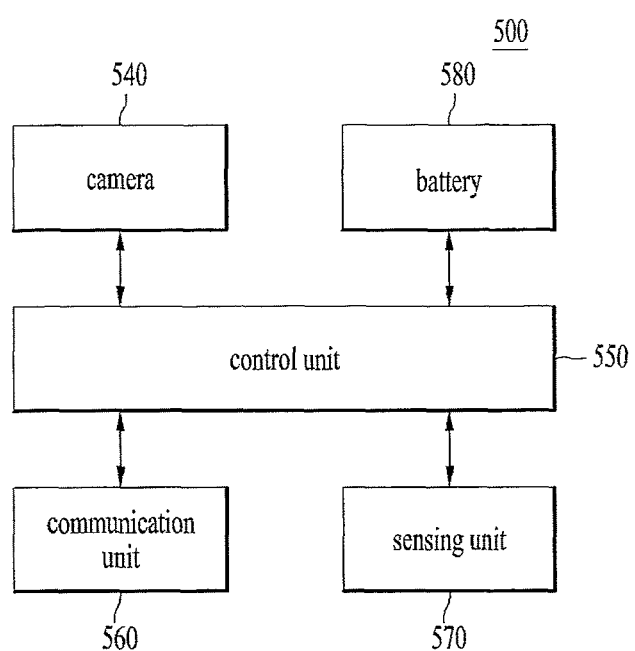
FIG. 6 is a block diagram illustrating one example of configuration modules of a drone according to an embodiment of the present invention.

In particular, FIG. 6 is a block diagram illustrating one example of configuration modules of a drone according to an embodiment of the present invention. Referring to FIG. 6, the drone 500 includes a camera 540, a control unit 550, a communication unit 560, a sensing unit 570, a battery 580, and the like. Such a configuration is not mandatory. According to other embodiments, the drone 500 may include components more or less than those shown in FIG. 6. A component shown in FIG. 6 may also be embodied into at least two components, or at least two components shown in FIG. 6 may be integrated into a single component.

In addition, the camera 540 obtains a still image or a video in accordance with a control signal of the control unit 550. The control signal of the control unit 550 for controlling the camera 540 can be based on a signal transmitted from the mobile terminal 100 through the communication unit 560. Further, the camera 540 can be set stationary so as not to have any motion. Alternatively, the camera 540 can be designed to move at a prescribed angle in a plane formed by an x-axis and y-axis (in addition, planes in parallel with the x-y plane are included) or a plane formed by z-axis (in addition, planes in parallel with the z-axis plane).

According to an embodiment, the camera 540 can be controlled to face a direction different from a direction faced by the drone 500. For example, when the drone 500 flies in a north direction with reference to a geomagnetic system, the camera 540 can face a direction other than the north direction. According to an embodiment, the camera 540 can be controlled by a camera control unit included in the control unit 550 or a camera control unit configured separately from the control unit 550.

In addition, the communication unit 560 is configured to transmit and receive data through a wireless communication with the wireless communication unit 110 of the mobile terminal 100. In this instance, the wireless communication unit 110 of the mobile terminal 100 may include at least one of the mobile communication module 112, the wireless internet module 113 and the short rage communication module 114. Further, the communication unit 560 can receive signals required for the control of the drone 500 from the mobile terminal 100 and can also transmit image data obtained through the camera 540 and sensing data sensed by the sensing unit 570 to the mobile terminal 100.

According to one embodiment, the communication unit 560 can receive a signal transmitted from a preset external device other than the mobile terminal 100. For instance, the external device may include a beacon. In particular, the beacon is a short-range wireless communication device based on Bluetooth 4.0 Protocol, for example. The communication unit 560 can obtain a location of a beacon using a signal transmitted by an external beacon. Hence, when a user carries the beacon, the drone 500 can accurately obtain user's location, which may be especially useful for a case that the drone 500 enables the user to photograph herself/himself in a manner that the drone 500 follows the corresponding user.

In addition, the sensing unit 570 may include at least one sensor configured to sense location information of the drone 500. In addition, the sensing unit 570 may include at least one sensor configured to sense state information of the drone 500, and more particularly, state information of the camera 540 included in the drone 500. For instance, the state information of the camera 540 may include a direction information of the camera 540. The sensing unit 570 may also include at least one sensor configured to sense a surrounding environment information around the drone 500. For instance, the sensing unit 570 may include at least one of a GPS sensor, a geomagnetic sensor, an acceleration sensor, a magnetic sensor, a gravity sensor (G-sensor), a gyroscope sensor, a motion sensor, an altitude sensor, an atmospheric sensor, a temperature sensor, and the like.

In addition, the control unit 550 can transmit the sensing data obtained by the sensing unit 570 to the mobile terminal 100 through the communication unit 560. The controller 500 can also combine data sensed by at least two sensors included in the sensing unit 570 together and can then transmit the combined data to the mobile terminal 100 through the communication unit 560.

In addition, the sensing unit 570 includes a ultrasonic sensor, an infrared sensor and the like, thereby preventing the drone 500 from colliding with an object near the drone 500. Further, the battery 580 can supply power required for operations of the respective components of the drone 500. In addition, the battery 580 can be chargeable. Further, the control unit 550 controls operations of the respective components of the drone 500.

Next, a method of controlling a drone and a camera included on the drone in a mobile terminal according to one embodiment of the present invention will be described in detail with reference to FIGS. 7 to 21. In addition, the drone according to one embodiment of the present invention can be controlled simultaneously by a plurality of devices as well as controlled by a single device.

In more detail, one of the plurality of the devices can correspond to a master device, and the rest of the devices can correspond to slave devices. For example, the master device corresponds to a main device and the slave device corresponds to a sub device. Further, a master device can assign or set a drone control function of a slave device. Based on the assignment or settings performed by the master device, the slave device can control a drone and a camera included on the drone. In particular, the slave device can perform only the drone control function assigned by the master device.

Regarding the embodiments shown in FIGS. 7 to 21, operations performed in the mobile terminal can be controlled by the controller 180 shown in FIG. 1A. For clarity of the following description, such operations are illustrated and described as performed/controlled by the mobile terminal in general. Further, various embodiments of the present invention disclosed in this specification can be implemented individually or by being combined together in part at least.

First, FIGS. 7 to 9 show a method of setting a single user mode or a multi user mode for controlling the drone through the mobile terminal according to an embodiment of the present invention. For example, FIG. 7 is a diagram illustrating one example of outputting a drone connection interface from a mobile terminal according to an embodiment of the present invention.

Referring to FIG. 7, when intending to control a drone, the user of the mobile terminal can execute a drone control application on a home screen or through a status bar 710. In this instance, the status bar 710 is a graphic user interface (GUI) configured to indicate a current use state of the mobile terminal and can provide the time, Wi-Fi information, switching to vibration/silence, real-time message information, and the like.

Further, if an input signal for a remote control option displayed on the status bar is sensed, the mobile terminal can output a quick menu for the remote control option. Referring to FIG. 7(a), when an input signal for a drone menu option among remote control options for a plurality of devices is sensed, the mobile terminal can output a quick menu 720 for determining a control mode of the drone. In this instance, the quick menu 720 can correspond to an interface for connecting to the drone. For example, as shown, the control mode displayed on the drone connection interface may include a single user mode and a multi user mode.

Also, if the drone control application is executed on the home screen, the mobile terminal can display the drone connection interface Referring to FIG. 7(a), the mobile terminal can sense an input signal 730 for a single user mode menu on the drone connection interface. For example, the input signal 730 may include a touch input, a gesture input, or the like. In this instance, the mobile terminal can perform a connection (e.g., a pairing) through a wireless communication between the mobile terminal and the drone.

When the connection between the mobile terminal and drone are completed, the mobile terminal can display a drone control interface 740. In particular, the drone control interface 740 can display at least one or more control objects for controlling the drone. For example, the control objects can include a drone motion control, an image photographing control, a video making control, a camera motion control, a function assignment control and the like. According to the embodiment shown in FIG. 7, since the mobile terminal corresponds to the single user mode for controlling the drone solely, the mobile terminal can display all control objects for controlling the drone on the drone control interface 740. Moreover, through various control objects displayed on the drone control interface 740, a user moves the drone and can perform various jobs such as a photographing job with a camera included on the drone and the like.

Next, FIG. 8 is a diagram illustrating one example of outputting a drone connection interface from a mobile terminal according to an embodiment of the present invention. Referring to FIG. 8(a), the mobile terminal can sense a first input signal 820 for a multi user mode menu on a drone connection interface 810. For example, the first input signal 820 may include a touch input, a gesture input, or the like. In this instance, a multi user mode corresponds to a plurality of devices controlling a drone simultaneously. The mobile terminal can also perform a connection (e.g., a pairing) through a wireless communication between the mobile terminal and the drone.

Further, if the mobile terminal senses a signal for setting the multi user mode from the user, the mobile terminal can correspond to a master device capable of assigning or distributing control functions required for controlling the drone. In particular, when a plurality of devices control the drone simultaneously, a device having set the multi user mode while initially connected to the drone corresponds to a master device or a main device. Hence, the mobile terminal playing a role as the master device connects a slave device to the drone and the mobile terminal and can then assign functions required for the drone control to each slave device.

When the mobile terminal completes the connection to the drone, the mobile terminal can display connectible devices on the drone connection interface 810. In this instance, the connectible device corresponds to a device capable of performing a pairing with the drone. According to an embodiment of the present invention, the connectible device can perform a wireless communication with the drone through a pairing by being located in a preset distance range from the drone and to perform such a wireless communication with the mobile terminal using Bluetooth or the like. Referring to FIG. 8(b), the mobile terminal can transmit a connecting signal to a device C from which the user's touch input is sensed. In this instance, the connecting signal can correspond to a signal indicating a connection between the mobile terminal and the device C.

Next, FIG. 9 is a diagram illustrating one example of outputting a drone connection interface from a mobile terminal according to an embodiment of the present invention. In particular, FIG. 9 shows a method for the mobile terminal, which is the master device, to assign each function to the device set as the connected device. According to an embodiment shown in FIG. 9, each of the connectible devices B, C and D shown in FIG. 8(b) is connected to the drone in response to an input signal.

Referring to FIG. 9, the mobile terminal can display at least one external device connected to the mobile terminal and the drone on a drone connection interface 910. In particular, when the mobile terminal transmits a connecting signal to at least one external device in FIG. 8(b), the at least one external device can transmit a successful connection signal to the mobile terminal. Further, the mobile terminal can display a device object corresponding to the connected device on the drone connection interface. According to an embodiment shown in FIG. 9(a), the device A can correspond to a master device or a main device and each of the devices B, C and D can correspond to a slave device or a sub device to which a function is assigned by the device A.

Further, while the device object is displayed, the mobile terminal can display at least one menu object 920 for controlling the drone and the camera included on the drone. For example, the at least one menu object 920 can correspond to a drone motion control, a camera motion control, a camera shot, a viewer, and a function assignment, by which at least one menu object 920 is non-limited. In addition, the at least one menu object 920 may include various menu objects required for a drone or camera control.

A user of the mobile terminal can distribute functions to the devices B, C and D connected to the corresponding menu objects, respectively. Further, referring to FIG. 9(*a*), the mobile terminal can sense an input signal 930 for the at least one menu object 920. In particular, the mobile terminal can sense the input signal 930 for the at least one menu object 920 and the at least one device object.

In this instance, the input signal 930 can correspond to a drag touch input. For example, the input signal 930 can correspond to a drag touch input that starts from a first menu object and then ends on a first device object. Alternatively, the input signal 930 may include one of various inputs such as a multi touch, a flicking touch and the like. According to the embodiment shown in FIG. 9(*a*), the first menu object corresponds to a drone control and the first device object corresponds to the mobile terminal that is the master device.

In this instance, the mobile terminal can set a drone control function in the mobile terminal in response to an input signal. Hence, the mobile terminal can control a motion of the drone. In addition, the mobile terminal can use a graphic effect 940 to indicate that the drone control function is set in the device A corresponding to the mobile terminal. For example, referring to FIG. 9(*b*), the mobile terminal darkens the menu object corresponding to the drone control and can output a color, which is output to the menu object corresponding to the drone control, to an icon of an object of the device A as a background color.

As mentioned in the foregoing description, the mobile terminal can match a function of the drone to a device easily using a drag touch or a multi touch. In addition, a user can set a camera control function in a device of a user B. In this instance, the mobile terminal can sense a drag touch input which starts from a menu object corresponding to a camera control and then ends on a device object of the user B. Moreover, the mobile terminal can transmit a signal for setting a camera control function to the device B in response to a drag touch input.

Further, the mobile terminal can set a plurality of functions in a single external device. For example, the mobile terminal can transmit a signal for setting a camera control function and a camera shot function to a device of a user C.

Figure 10:
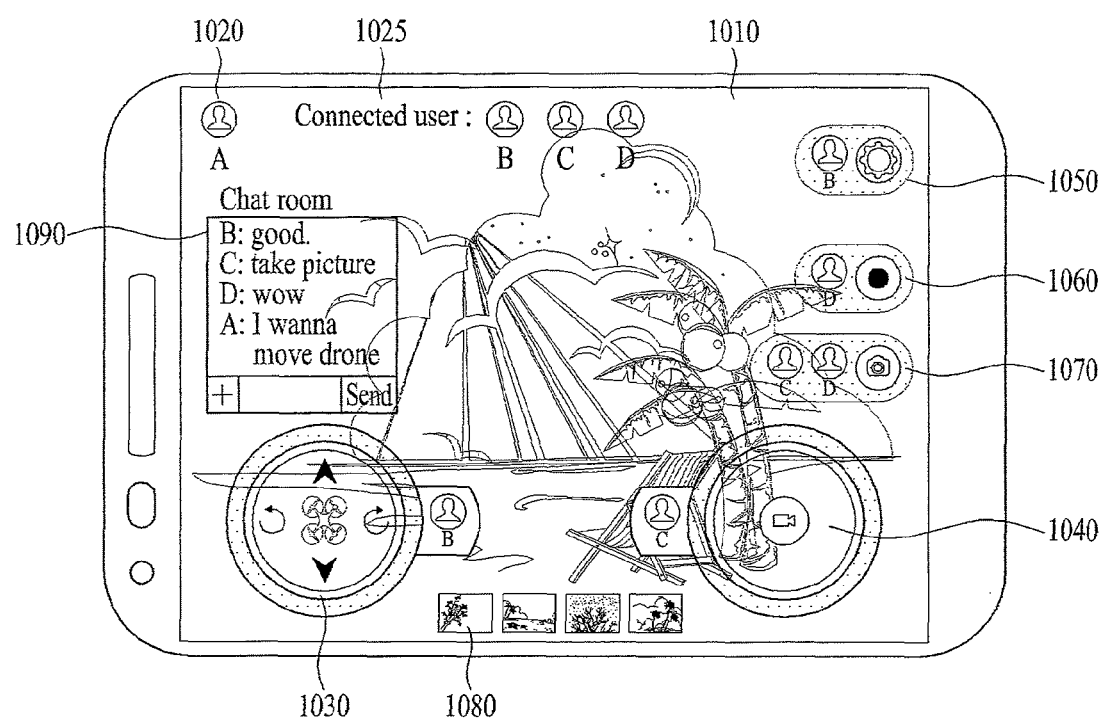
FIG. 10 is a diagram illustrating one example of a drone control interface displayed on a mobile terminal according to an embodiment of the present invention.
Figure 11:
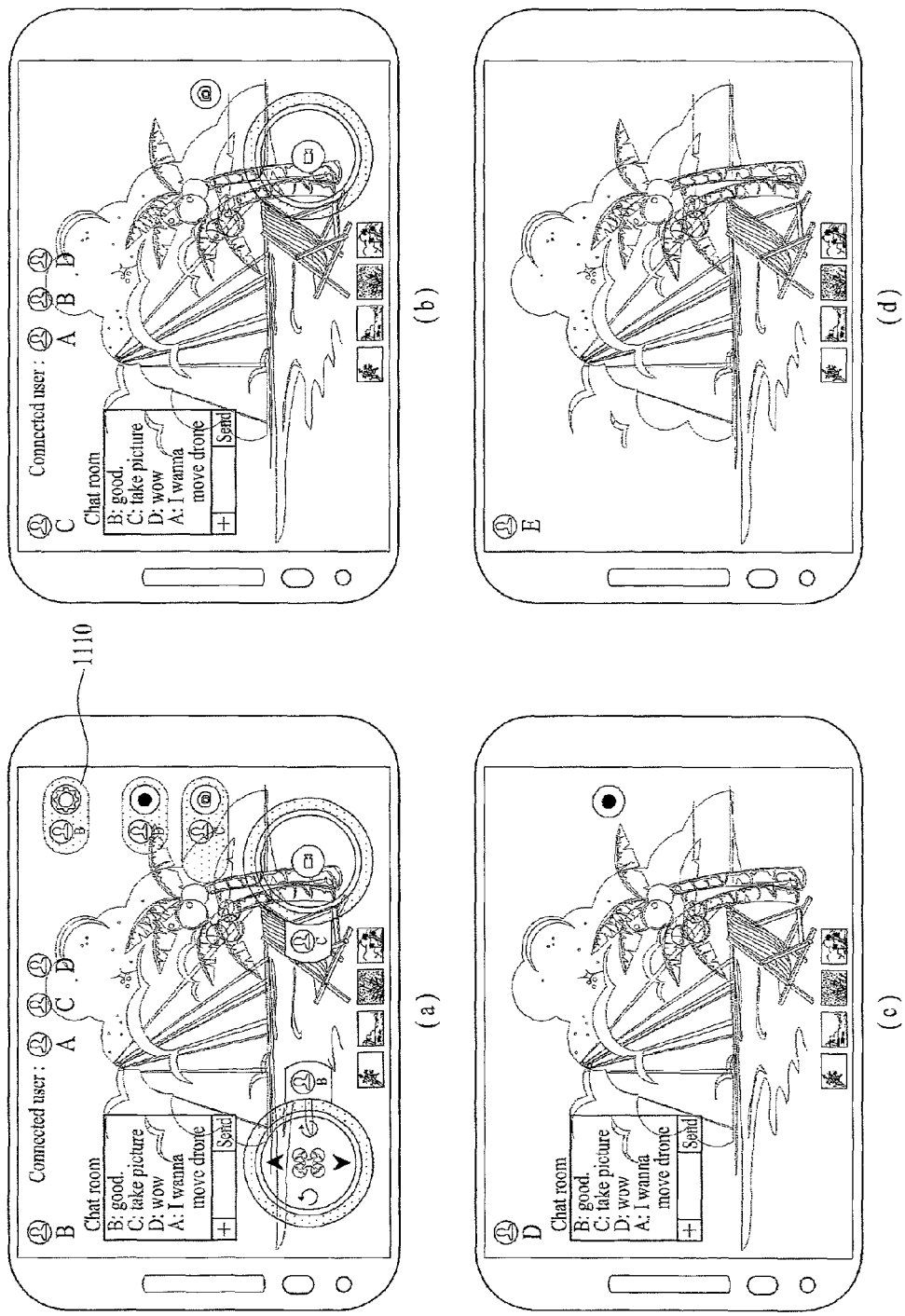
FIG. 11 is a diagram illustrating one example of a drone control interface displayed on a mobile terminal according to an embodiment of the present invention.

Next, FIGS. 10 and 11 are diagrams of a drone control interface output to a display unit when completing assignment of each device function set in FIGS. 7 to 9. In particular, the drone control interface is an interface on which a GUI for controlling the drone and the camera includes a drone control program or a drone control application.

In more detail, FIG. 10 is a diagram illustrating one example of a drone control interface displayed on a mobile terminal according to an embodiment of the present invention. Further, FIG. 10 shows a drone control interface provided to a mobile terminal corresponding to a master device. According to an embodiment shown in FIG. 10, a mobile terminal corresponds to a mobile terminal of a user A and is currently connected to a mobile terminal of a user B (hereinafter named 'device B'), a mobile terminal of a user C (hereinafter named 'device C'), and a mobile terminal of a user D (hereinafter named 'device D').

Referring to FIG. 10, a drone control interface 1010 can display various objects for controlling the drone and corresponding camera. For example, the drone control interface 1010 can display an object corresponding to a control function assigned to control the drone or the camera and a default object unrelated to the control.

In this instance, the object corresponding to the assigned control function may include a drone control object 1030, a camera control object 1040, a function assignment object 1050, a video shot object 1060, and an image shot object 1070. In addition, the object corresponding to the control function can be simultaneously displayed together with an indicator indicating at least one external device to which the control function is assigned. For example, referring to FIG. 10, the drone control object 1030 can be simultaneously displayed together with an indicator indicating the device B to which the drone control function is assigned.

The default object may include a user object 1020, a connected device object 1025, a gallery object 1080, and a chat object 1090. Further, the mobile terminal can display a device corresponding to each of the objects as well. In this instance, the objects appearing on the drone control interface 1010 are exemplary only and various other objects can be further included.

Further, the drone control interface 1010 can display a real-time preview image sensed from a view angle region of the camera included on the drone in the background having various objects displayed thereon. In addition, the user object 1020 may include a user of the mobile terminal. In particular, the user object 1020 can display a photo together with a name of ID of the user of the mobile terminal. The connected device object 1025 can indicate another external device connected to the mobile terminal and the drone. In particular, the connected device object 1025 can display a photo together with a name or ID of a user of the connected external device.

The drone control object 1030 can include a direction key for moving the drone by changing a state of the drone from a landing state into a flight state, for example. According to the embodiment shown in FIG. 10, the drone control object 1030 can be displayed together with an object corresponding to the device B in which the drone control function is set. The camera control object 1040 can include a direction control key of the camera included on the drone. According to the embodiment shown in FIG. 10, the camera control object 1040 can be displayed together with an object corresponding to the device C in which the camera control function is set.

The function assignment object 1050 can include an icon corresponding to a function setting. Although a function assignment can be basically performed by the device A corresponding to the master device, a connected different device can perform the function assignment in accordance with the setting of the master device. According to the embodiment shown in FIG. 10, the setting (function assignment) object 1050 can be displayed together with an object corresponding to the device B to which a control authority is granted by the mobile terminal.

The video shot object 1060 can include a control key for starting/ending a video shot through the camera included on the drone. According to the embodiment shown in FIG. 10, the video shot object 1060 can be displayed together with an object corresponding to the device B in which the video shot function is set.

The image shot object 1070 can include a control key for capturing a still image through the camera included on the drone. According to the embodiment shown in FIG. 10, the image shot object 1070 can be displayed together with an object corresponding to the device C having the image shot function set therein and an object corresponding to the device D having the image shot function set therein.

The gallery object 1080 can include at least one thumbnail image of an image or video shot by the camera included on the drone. If an input signal for the gallery object 1080 is sensed, the mobile terminal can display a gallery interface. This will be described in detail together with FIGS. 10 and 17 later.

Further, while a plurality of users control or use the drone, they can also chat with each other in real time. Since a plurality of the users control a single drone simultaneously, a drone control can be efficiently performed and users' interests can be enhanced. Hence, the mobile terminal displays a chat object 1090, whereby real-time chats performed between the devices connected to the mobile terminal can be displayed.

Next, FIG. 11 is a diagram illustrating one example of a drone control interface displayed on a mobile terminal according to an embodiment of the present invention. In particular, FIG. 11 shows a drone control interface provided not to a master device but to a slave device. Referring to FIG. 11, for a slave device, in accordance with a control function set in a master device, the objects displayed on a drone control interface are different per device. In particular, each of the devices shown in FIGS. 11(*a*) to 11(*d*) can display different objects on a corresponding drone control interface.

For example, when a master device grants a function setting authority to a slave device, the slave device can display the same drone control interface of the master device. Referring to FIG. 11(*a*), a slave device B receives a signal corresponding to a function setting from a master device A. Because the device B is a slave device of the device A, the device B cannot control a function set in the device A. However, the device B can assign a function for a different device other than the device A corresponding to the master device.

In another example, a slave device can display an object set for a function by a master device on a drone control device only. In this instance, the slave device can display a chat object unrelated to a function, a user object, a connected device object, a gallery object and the like. Moreover, in this instance, the slave device may not display an object related to a function set in another device on the drone control interface.

Referring to FIG. 11(*b*), as a device C receives a camera control signal and an image shot control signal from the device A, the device C can display a camera control object and an image shot object on a drone control interface. Referring to FIG. 11(*c*), as a device D receives a video shot control signal from the device A, the device C can display a video shot object on a drone control interface.

In another example, if any function is not set in a slave device by a master device, the slave device can display an object unrelated to a function on a drone control interface. Referring to FIG. 11(*d*), a device E corresponds to a state of being connected to the devices A to D and the drone. Further, the device E can fail to receive a control signal for any function from the device A corresponding to the master device. In this instance, the device E can display a real-time image, which is sensed from a view angle region of a camera included on the drone, and a gallery object on the drone control interface only. In addition, the device E can display a chat object, which is a default object, on the drone control interface.

Next, FIGS. 12 to 14 are diagrams illustrating a method for a master device to change or add a control function set in a slave device when a drone and the slave device are initially connected. According to an embodiment of the present invention, since a master device has an authority for setting a function of a slave device, a user of the master device can add or delete a function of the slave device through a simple input to a drone control interface. According to the embodiments shown in FIGS. 12 to 14, assume that a mobile terminal corresponds to a master device.

FIG. 12 is a diagram illustrating one example of adding a function for a drone control in a mobile terminal according to an embodiment of the present invention. Referring to FIG. 12, a user A of a master device wants to add a user D of a slave device as a user corresponding to a camera control object.

Referring to FIG. 12(*a*), the mobile terminal can sense an input signal 1240 for at least one of connected device objects and at least one of objects corresponding to control functions from a drone control interface 1210. In this instance, the input signal 1240 can correspond to a drag touch input. For example, according to the embodiment shown in FIG. 12, the input signal 1240 corresponds to a drag touch input that starts from a position corresponding to an object D 1230 among connected users and then ends to a position corresponding to a camera control object 1220. Further, the input signal 1240 can correspond to one of a multi touch input, a flicking touch input and the like.

In this instance, referring to FIG. 12(*b*), the mobile terminal can add a device D as a device corresponding to the camera control object 1220 in the drone control interface 1210 in addition to a previously set device C. Moreover, the mobile terminal can transmit an assignment signal of a control function corresponding to a camera control function to the device D. In response to the assignment signal, the device D can display the camera control object on the drone control interface. Thus, a user C and a user D can simultaneously control a direction and zoom of the camera included on the drone.

Next, FIG. 13 is a diagram illustrating one example of removing a function for a drone control in a mobile terminal according to an embodiment of the present invention. Referring to FIG. 13, a user A of a master device wants to delete a user C of a slave device from users corresponding to an image shot object.

Referring to FIG. 13(*a*), the mobile terminal can sense an input signal 1330 for an indicator indicating an external device from a drone control interface 1310. In this instance, the input signal 1330 can correspond to a flicking touch input. For example, according to the embodiment shown in FIG. 13, the input signal 1330 can correspond to a flicking touch input that starts from a position corresponding to an image shot object 1340 and then ends to a boundary of one side of the drone control interface 1310. Alternatively, the input signal 1330 can correspond to a drag touch input.

If so, referring to FIG. 13(*b*), when a user C and a user D are previously set as users corresponding to the image shot object 1340, the mobile terminal can remove the user C from the drone control interface 1310. In addition, the mobile terminal can transmit a signal for stopping or cancelling a function corresponding to an image shot control to the device C. If so, an image shot object can be deleted from the device C. Thus, a user can solely take an image through the camera included on the drone.

FIG. 14 is a diagram illustrating one example of changing a control function of a drone controllable device in a mobile terminal according to an embodiment of the present invention. Referring to FIG. 14, a user of a master device A changes a function set in a user B of a slave device into a video shot function from a drone control function.

Referring to FIG. 14(*a*), a mobile terminal can sense an input signal 1440 for selecting an indicator indicating a first external device having a first function assigned thereto and an object corresponding to a second function from a drone control interface 1410. In this instance, the input signal 1440 can correspond to one of a drag touch input and a multi touch input. For example, according to the embodiment shown in FIG. 14, the input signal 1440 can correspond to a drag touch input that starts from apposition corresponding to a drone control object 1320 and then ends to a position corresponding to a video shot object 1430.

If so, referring to FIG. 14(b), the mobile terminal can change a device of a user B having a drone control function set therein to perform a video shot function in the drone control interface 1410. In addition, the mobile terminal can transmit a control signal for stopping a drone control function and adding a video shot function to the device B. In response to the control signal, the device B deletes a drone control object from a drone control interface and can display a video shot object on the drone control interface. Thus, the user B connected to the drone can perform the video shot function on the drone control interface instead of performing the drone control function.

Figure 15:
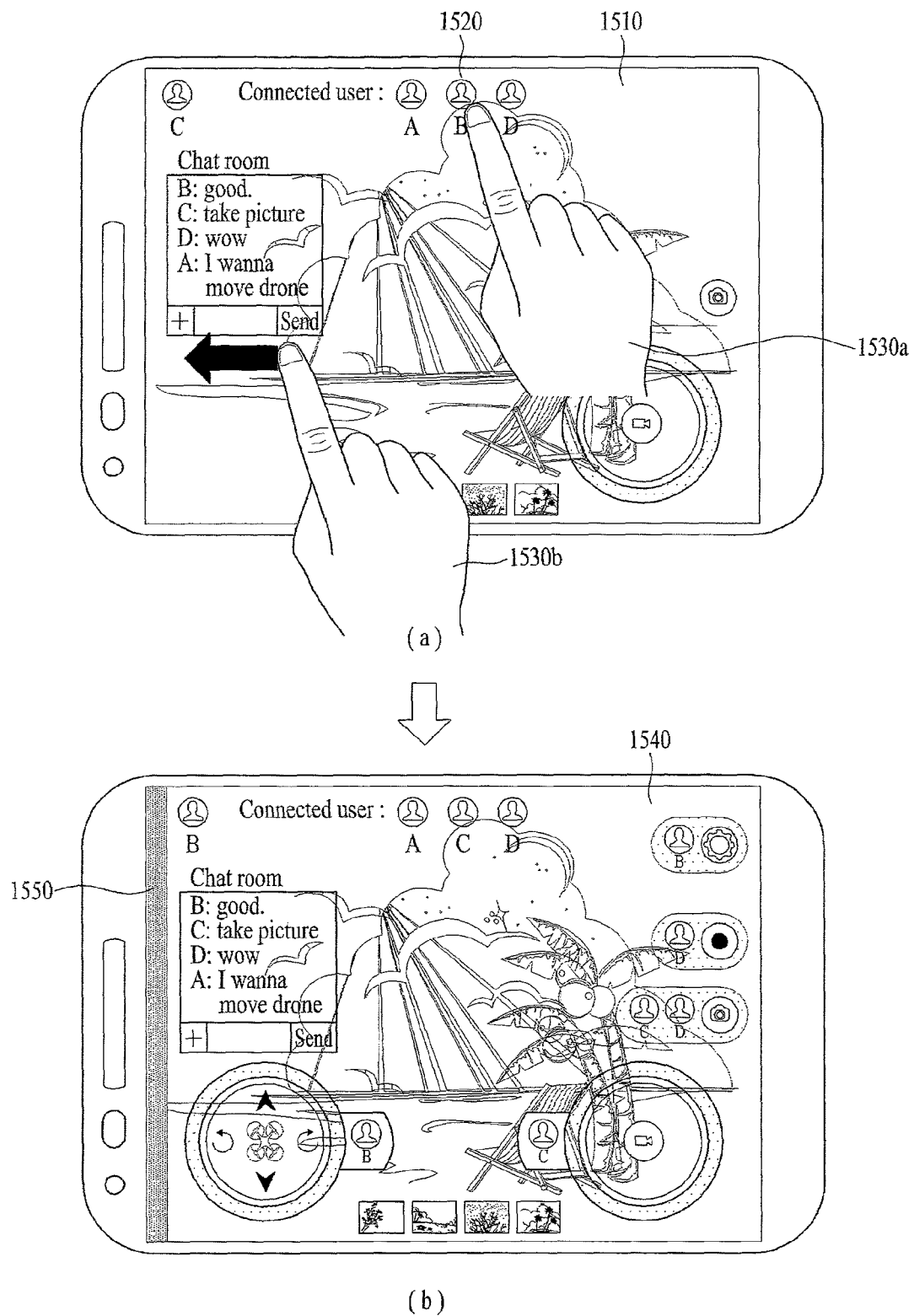
FIG. 15 is a diagram illustrating one example of guiding a control of a drone in a mobile terminal according to an embodiment of the present invention.

In the following description, FIGS. 15 and 16 show a method for a slave device to make a request for controlling a drone. In particular, FIGS. 15 and 16 show a method for a slave device to make a request for controlling a function, of which control authority is not granted to the slave device, to a master device or a device having the control authority. The reason for this is that the slave device can perform a limited function required for a drone control or a camera control granted by the master device.

FIG. 15 is a diagram illustrating one example of guiding a control of a drone in a mobile terminal according to an embodiment of the present invention. In particular, FIG. 15 is a diagram illustrating a method of a user C 1510 not having a drone control authority and making a request for a control of the drone to a user A having the drone control authority. In the following description, a signal transmission between a device (hereinafter named 'device C') of a user C (hereinafter named 'device C') and a device (hereinafter named 'device B') of a user B is shown.

Referring to FIG. 15(a), a device C can display a camera control object corresponding to a camera control function, of which control authority is granted to a user C, on a display unit. Further, the user C may want to use a different control function, of which control authority is not granted to the device C, other than a camera control. For example, the user C may want to move a location of a drone to the left with reference to a current location.

If so, referring to FIG. 15(a), the device C can sense a first input signal 1530a for an object 1520 corresponding to a user B. For example, the first input signal 1530a can correspond to one of a short touch input and a long touch input. Subsequently, the device C can sense a second input signal 1530b. For example, the second input signal 1530b can correspond to one of a drag touch input and a flicking touch input in a prescribed direction. According to the embodiment shown in FIG. 15, the second input signal 1530b corresponds to a drag touch input in a left direction. Alternatively, the second input signal 1530b can correspond to a signal in continuation with the first input signal 1530a.

In this instance, in response to the first input signal 1530a and the second input signal 1530b, the device C can transmit a drone control signal to the device B. In particular, the drone control signal can correspond to a signal for requesting to move a location of the drone to the left to the device B having the drone control authority.

Further, the device B can receive a drone control signal from the device C. If so, referring to FIG. 15(b), the device B can output an indicator 1550 in response to the received drone control signal. For example, the indicator 1550 may appear as a bar shape on one of top, bottom, right and left sides of the display unit. Moreover, according to the embodiment shown in FIG. 15, since the drone control signal is the signal for requesting to move the location of the drone to the left side, the indicator 1550 may appear one the left side of the display unit. In this instance, the user B recognizes user C's intention and can then manipulate the drone control object to move the location of the drone to the left side. The embodiment shown in FIG. 15 can also be applicable to other functions related to the drone manipulation or the camera control as well as the drone control function.

Next, FIG. 16 is a diagram illustrating one example of guiding a control of a drone in a mobile terminal according to an embodiment of the present invention. In particular, FIG. 16 is a diagram to describe a method a user C 1610 failing to have a drone control authority to make a request for a control of a drone to a different user having the drone control authority.

For instance, referring to FIG. 16(a), a device C can display a voice icon 1629 on a drone control interface. In this instance, the voice icon 1620 can correspond to an icon for sending a voice message for a different device connected to the device C. In addition, the device C can sense an input signal 1630 for the voice icon 1620. For example, the input signal 1630 can correspond to one of a short touch input and a long touch input. Thus, a user C can speak a voice message 1640 and the user C's voice message can be received by a different device connected to the device C.

In another instance, referring to FIG. 16(b), the device C can display a chat object 1650 on the drone control interface. In this instance, the chat object 1650 can correspond to an object for enabling the different device connected to the device C to make a real-time chat. In addition, the device C may sense an input signal 1660 for the chat object 1650. For example, the input signal 1660 can correspond to one of a short touch input and a long touch input. In this instance, the user C can compose a text message. In addition, the text message composed by the user C can be received by a different device.

Next, FIGS. 17 and 18 are diagrams illustrating a gallery interface including an image or video taken through a drone control interface. In this instance, the gallery interface can correspond to an interface configured to display an image or video taken using a camera provided to a drone by controlling the camera through the drone control interface.

FIG. 17 is a diagram illustrating one example of a gallery interface corresponding to a gallery object in a mobile terminal according to an embodiment of the present invention. According to the embodiment shown in FIG. 17, a mobile terminal is a master device, i.e., a device of a user A.

Further, a mobile terminal can sense a first input signal for a gallery object displayed on a drone control interface. In this instance, for example, the input signal can correspond to one of a short touch input and a long touch input.

Referring to FIG. 17(a), the mobile terminal can display a gallery interface 1710 in response to the first input signal. For example, the gallery interface 1710 can correspond to a subordinate item of a gallery application or the drone control interface, which is run separately from the drone control interface.

Referring to FIG. 17(a), the mobile terminal can display a thumbnail image indicating at least one image or video taken through a drone on the gallery interface 1710. In addition, the mobile terminal can display a real-time preview 1711 on a right top end of the gallery interface 1710.

In this instance, the real-time preview 1711 can correspond to a screen for displaying an image sensed within a view angle region of a camera included on the drone by real time.

Further, if a second input signal 1720 for the real-time preview 1711 is sensed, the mobile terminal ends the gallery interface 1710 and can display a drone control interface 1730. For example, the second input signal 1740 can correspond to one of a short touch input and a long touch input. Referring to FIG. 17(b), if a third input signal 1740 for a gallery object 1731 displayed on the drone control interface 1730 is sensed, the mobile terminal ends the drone control interface 1730 and can display the gallery interface 1710.

FIG. 18 is a diagram illustrating one example of a gallery interface corresponding to a gallery object in a mobile terminal according to an embodiment of the present invention. Substance redundant with the former description with reference to FIG. 17 shall be omitted from the following description with reference to FIG. 18.

Referring to FIG. 18(a), a mobile terminal can sense an input signal 1820 for at least one thumbnail image displayed on a gallery interface 1810. For example, the input signal 1820 can correspond to one of a short touch input and a long touch input. In this instance, referring to FIG. 18(b), in response to the input signal 1820, the mobile terminal can display an enlarged image or video 1830 corresponding to the thumbnail image 1811 by zoom-in.

Further, the mobile terminal can display an indicator 1840 indicating a preference on one side of the enlarged image or video. In particular, the indicator 1840 indicating the preference can display a user having marked the preference for the corresponding image or video. Through this, users of other devices connected to the mobile terminal can check the preference of the image or video and a subject of person who prefers the corresponding image or video.

In addition, in response to an input signal, the mobile terminal can display an indicator indicating a preference on an image corresponding to a thumbnail image (not shown in FIG. 18). In this instance, if the input signal for the thumbnail image further increases, the mobile terminal can change the graphic effects of the indicator indicating the preference more variously.

Figure 19:
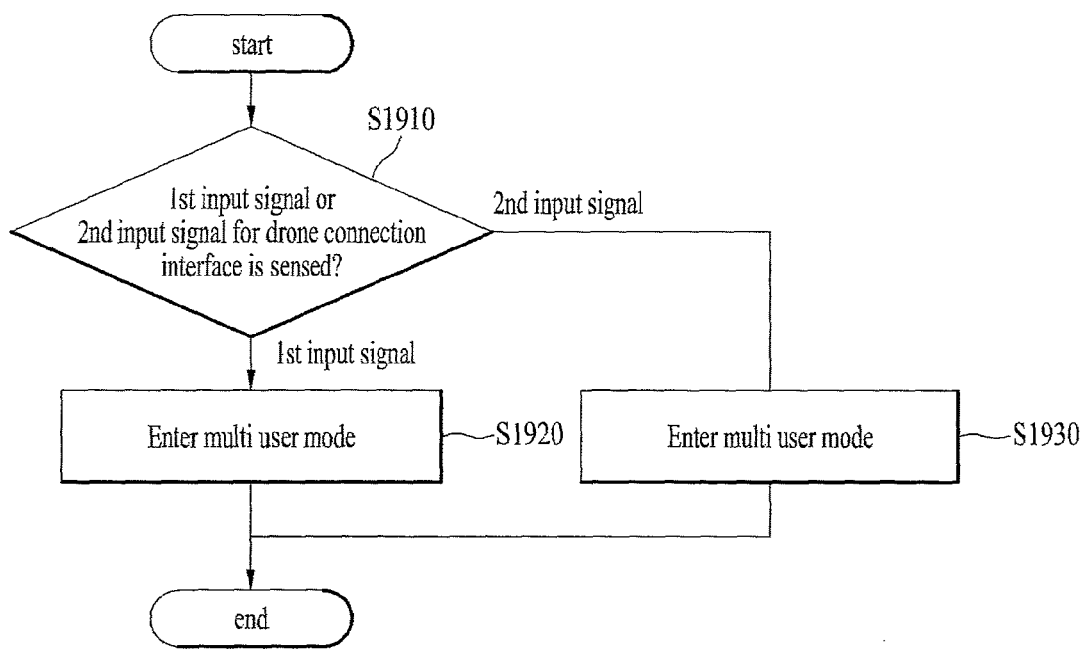
FIG. 19 is a flowchart illustrating a method of controlling a mobile terminal according to an embodiment of the present invention.

Next, FIG. 19 is a flowchart illustrating a method of controlling a mobile terminal according to an embodiment of the present invention. The respective steps shown in FIG. 19 can be controlled by the controller of the mobile terminal shown in FIG. 1.

Referring to FIG. 19, the mobile terminal can sense a first input signal or a second input signal for a drone connection interface (S1910). As mentioned in the foregoing description with reference to FIG. 7 and FIG. 8, the mobile terminal can display an icon corresponding to a single user mode and an icon corresponding to a multi user mode on the drone connection interface.

If the first input signal is sensed in the step S1910, the mobile terminal can enter the multi user mode. In particular, if an input signal for the icon corresponding to the multi user mode is sensed, the mobile terminal can enter the multi user mode. If so, the mobile terminal performs a pairing with a drone and can attempt a connection to another device. This is described in detail with reference to FIG. 20 later.

Moreover, if the second input signal is sensed in the step S1910, the mobile terminal can enter the single user mode. In particular, if an input signal for the icon corresponding to the single user mode is sensed, the mobile terminal can enter the single user mode. If so, the mobile terminal performs a pairing with a drone and can display objects related to a drone control on the drone control interface.

Figure 20:
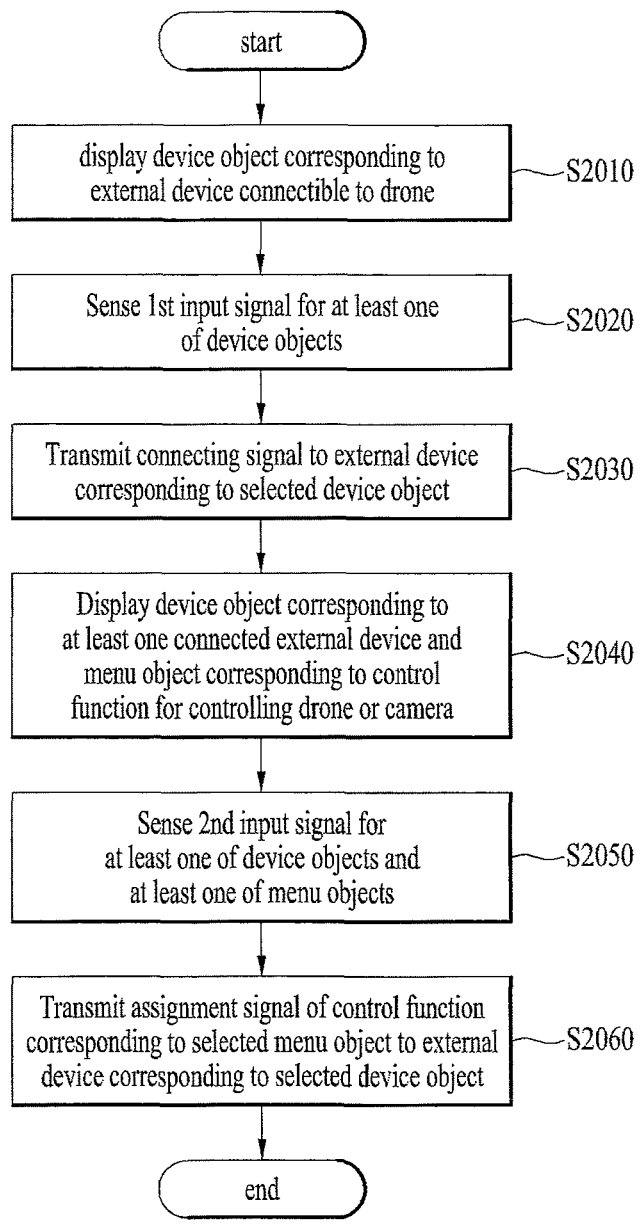
FIG. 20 is a flowchart illustrating a method of controlling a mobile terminal according to an embodiment of the present invention.

FIG. 20 is a flowchart illustrating a method of controlling a mobile terminal according to an embodiment of the present invention. The respective steps shown in FIG. 20 can be controlled by the controller of the mobile terminal shown in FIG. 1. In addition, the respective steps shown in FIG. 20 can correspond to an embodiment for the case that the mobile terminal enters the multi user mode in FIG. 19.

Referring to FIG. 20, a mobile terminal can display a device object corresponding to an external device connectible to a drone on a drone connection interface (S2010). As mentioned in the foregoing description with reference to FIG. 8, the connectible device can correspond to a device capable of a wireless communication with the mobile terminal by being connectible to the drone.

In addition, the mobile terminal can sense a first input signal for at least one of the device objects (S2020). As mentioned in the foregoing description with reference to FIG. 8, the first input signal may include one of a touch input, a gesture input and the like. In response to the first input signal, the mobile terminal can transmit a connecting signal to an external device corresponding to the selected device object (S2030). If so, a device corresponding to a first device object receives the connecting signal and can then perform a connection to at least one of the mobile terminal and the drone.

Further, the mobile terminal can display a device object corresponding to at least one device connected to the drone connection interface and a menu object corresponding to a control function for a control of a drone or a control of a camera included on the drone (S2040). As mentioned in the foregoing description with reference to FIG. 8, the at least one menu object may include a drone control, a camera control, a camera shot, a function assignment, and the like.

Further, the mobile terminal can sense a second input signal for at least one of the device objects and at least one of the menu objects (S2050). For example, the second input signal can correspond to one of a drag touch input and a multi touch input. Thereafter, in response to a second input signal, the mobile terminal can transmit an assignment signal of the control function corresponding to the selected menu object to the external device corresponding to the selected device object (S2060). If so, in response to the received control signal, a device corresponding to a first object can display a controllable object on a drone control interface.

FIG. 21 is a flowchart illustrating a method of controlling a mobile terminal according to an embodiment of the present invention. The respective steps shown in FIG. 21 can be controlled by the controller 180 of the mobile terminal 100 shown in FIG. 1. In addition, the respective steps shown in FIG. 21 can correspond to an embodiment of a slave device when the mobile terminal enters the multi user mode in FIG. 19.

Referring to FIG. 21, a mobile terminal can receive a connecting signal from an external device (S2110). In this instance, the external device can correspond to a master device. In response to the received connecting signal, the mobile terminal can perform a connection to a drone (S2120). If the connection to the drone is completed, the mobile terminal can display a drone control interface on a display unit.

The mobile terminal can receive an assignment signal of a control function for controlling the drone or camera from the external device (S2130). Thereafter, in response to the received assignment signal of the control function, the mobile terminal can display a control object corresponding to the received control signal on the drone control interface (S2140). For example, as mentioned in the foregoing description with reference to FIG. 11, in response to the received control signal, the mobile terminal can display the drone control interface including all objects displayed on a drone control interface of a master device. In another example, the mobile terminal can display a control object corresponding to the received control signal on the drone control interface only.

Accordingly, the present invention provides the following advantages. For example when a video or image is taken through a camera provided to a drone, a plurality of devices can efficiently control a single drone.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising: a display; a wireless communication processor configured to transceive data with a drone and an external device through wireless communication; and a controller configured to: display a mobile terminal graphic object corresponding to the mobile terminal, an external device graphic object corresponding to the external device, a drone control menu object and a camera control menu object on the display, assign the external device to control the drone in response to the external device graphic object and the drone control menu object being selected, assign the external device to control a camera on the drone in response to the external device graphic object and the camera control menu object being selected, assign the mobile terminal to control the drone in response to the mobile terminal graphic object and the drone control menu object being selected, assign the mobile terminal to control the camera on the drone in response to the mobile terminal graphic object and the camera control menu object being selected, display a drone control interface on the display including: a drone control graphic object including controls for controlling a flight of the drone and including at least one of a first user indicator when the mobile terminal is assigned to control the drone and a second user indicator when the external device is assigned to control the drone, and a camera control graphic object including controls for controlling the camera of the drone and including at least one of the first indicator when the mobile terminal is assigned to control the camera and the second indicator when the external device is assigned to control the camera, control the flight of the drone in response to the controls of the drone control graphic object being selected, and control the camera of the drone in response to the controls of the camera control graphic object being selected.

2. The mobile terminal of claim 1, wherein the controller is further configured to:
    remove the assignment of the mobile terminal from controlling the drone in response to a removal of the first user indicator from the drone control graphic object and remove the assignment of the external device from controlling the drone in response to a removal of the second user indicator from the drone control graphic object, and
    remove the assignment of the mobile terminal from controlling the camera in response to a removal of the first user indicator from the camera control graphic object and remove the assignment of the external device from controlling the camera in response to a removal of the second user indicator from the camera control graphic object.

3. The mobile terminal of claim 1, wherein the controller is further configured to:
    share control of the camera on the drone between the mobile terminal and the external device in response to the first user indicator and the second user indicator being included with the camera control graphic object.

4. The mobile terminal of claim 1, wherein the drone control interface further includes:
    a chat object for performing a chatting session with a user of the external device,
    at least one connected device object indicating the external device connected with the mobile terminal and the drone, and
    a gallery object including images captured by the camera.

5. The mobile terminal of claim 4, wherein the controller is further configured to:
    display a gallery interface including at least one thumbnail image corresponding to an image or video taken through the camera in response to a selection of the gallery object.

6. The mobile terminal of claim 5, wherein the controller is further configured to:
    display a real-time preview on the gallery interface indicating a real-time view of images obtained by the camera.

7. The mobile terminal of claim 1, wherein the controller is further configured to:
    receive a drone control request from the external device for changing a flight direction of the drone, and
    change the flight direction of the drone in response to the received drone control request.

8. The mobile terminal of claim 1, wherein the controller is further configured to:
    display a single user mode graphic object for the mobile terminal controlling the drone and the camera alone and a multi user mode graphic object for selectively allowing other external devices to control the drone and the camera.

9. The mobile terminal of claim 8, wherein the controller is further configured to:
- display the mobile terminal graphic object and the external device graphic object, in response to a selection of the multi user mode graphic object, and
- transmit a drone connection signal to the external device in response to a selection of the displayed external device graphic object.

\* \* \* \* \*